(12) United States Patent
McHugh et al.

(10) Patent No.: US 11,164,380 B2
(45) Date of Patent: Nov. 2, 2021

(54) SYSTEM AND METHOD FOR TRANSITION BOUNDARIES AND DISTANCE RESPONSIVE INTERFACES IN AUGMENTED AND VIRTUAL REALITY

(71) Applicant: Samsung Electronics Co., Ltd., Suwon-si (KR)

(72) Inventors: Andrew R. McHugh, Fremont, CA (US); Duncan Knarr, Santa Rosa, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/126,990

(22) Filed: Sep. 10, 2018

(65) Prior Publication Data

US 2019/0172262 A1    Jun. 6, 2019

Related U.S. Application Data

(60) Provisional application No. 62/595,052, filed on Dec. 5, 2017.

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0101* (2013.01); *G06F 3/012* (2013.01);
(Continued)

(58) Field of Classification Search
CPC combination set(s) only.
See application file for complete search history.

(56) References Cited

U.S. PATENT DOCUMENTS 6,037,936 A * 3/2000 Ellenby .................. G01C 17/34
348/211.8
8,417,262 B2   4/2013 Loeb et al.
(Continued)

FOREIGN PATENT DOCUMENTS

CN    105988219 A    10/2016
CN    106919254 A    7/2017
(Continued)

OTHER PUBLICATIONS

European Patent Office, "European Search Report," Application No. EP18210466.1, dated Apr. 12, 2019, 8 pages.
(Continued)

*Primary Examiner* — Motilewa Good Johnson

(57) ABSTRACT

A head mounted display (HMD) device is provided. The HMD has a display panel, a depth or distance sensor to measure distances between the HMD and a real object. The HMD device sets a close transition boundary distance (CTBD) between the HMD and a close transition boundary (CTB). A far transition boundary distance (FTBD) is set between the HMD and a far transition boundary (FTB). The CTBD is less than the FTBD. As a real object that has associated near and far virtual content moves nearer to the HMD device and crosses the CTB, the virtual content transitions to near virtual content for viewing on the HMD. As the real object moves away from the HMD and crosses the FTB, the virtual content transitions to the far virtual content for viewing on the HMD.

20 Claims, 15 Drawing Sheets

(51) Int. Cl.
G06F 3/01 (2006.01)
G06F 3/0481 (2013.01)

(52) U.S. Cl.
CPC ........ *G06F 3/0481* (2013.01); *G06F 3/04817* (2013.01); *G02B 2027/0138* (2013.01); *G02B 2027/0141* (2013.01)

(56) References Cited

U.S. PATENT DOCUMENTS

| | | | | |
|---|---|---|---|---|
| 8,754,831 | B2* | 6/2014 | Kollin | G06F 3/011 |
| | | | | 345/32 |
| 9,081,177 | B2 | 7/2015 | Wong et al. | |
| 9,170,766 | B2* | 10/2015 | Meier | G02B 27/017 |
| 9,204,050 | B2* | 12/2015 | Emura | G06F 3/0488 |
| 9,305,371 | B2* | 4/2016 | Arcas | G06T 11/001 |
| 9,558,581 | B2* | 1/2017 | Wang | G06T 19/006 |
| 9,599,818 | B2 | 3/2017 | Yamagishi et al. | |
| 9,646,422 | B2* | 5/2017 | Fedosov | G06F 3/011 |
| 9,671,863 | B2* | 6/2017 | Fein | G06T 11/60 |
| 9,870,642 | B2* | 1/2018 | Fialho | G06T 15/20 |
| 9,922,446 | B2* | 3/2018 | Wang | G06T 15/20 |
| 9,928,626 | B2* | 3/2018 | Kasahara | G06T 11/60 |
| 10,269,179 | B2* | 4/2019 | Fein | G06T 11/60 |
| 2006/0132482 | A1* | 6/2006 | Oh | G06T 13/80 |
| | | | | 345/419 |
| 2007/0162942 | A1* | 7/2007 | Hamynen | H04M 1/72572 |
| | | | | 725/105 |
| 2008/0024484 | A1* | 1/2008 | Naimark | G06T 15/205 |
| | | | | 345/419 |
| 2009/0265670 | A1 | 10/2009 | Kim et al. | |
| 2010/0149399 | A1* | 6/2010 | Mukai | H04N 21/8153 |
| | | | | 348/333.02 |
| 2012/0176410 | A1* | 7/2012 | Meier | G06F 3/011 |
| | | | | 345/633 |
| 2013/0016129 | A1 | 1/2013 | Gossweiler, III et al. | |
| 2014/0078043 | A1 | 3/2014 | Kim | |
| 2014/0354690 | A1* | 12/2014 | Walters | G06T 19/006 |
| | | | | 345/633 |
| 2014/0375691 | A1* | 12/2014 | Kasahara | G06T 11/60 |
| | | | | 345/633 |
| 2015/0109338 | A1* | 4/2015 | McKinnon | G06F 16/50 |
| | | | | 345/633 |
| 2015/0187137 | A1* | 7/2015 | Mullins | G06F 3/011 |
| | | | | 345/633 |
| 2015/0302648 | A1 | 10/2015 | Zhang | |
| 2016/0019718 | A1 | 1/2016 | Mukkamala et al. | |
| 2016/0123745 | A1 | 5/2016 | Cotier et al. | |
| 2016/0148433 | A1* | 5/2016 | Petrovskaya | G06T 19/006 |
| | | | | 345/633 |
| 2016/0274358 | A1 | 9/2016 | Yajima et al. | |
| 2016/0313790 | A1* | 10/2016 | Clement | G02B 27/0093 |
| 2016/0343169 | A1* | 11/2016 | Mullins | G02B 27/017 |
| 2017/0092002 | A1* | 3/2017 | Mullins | G02B 27/0172 |
| 2017/0228869 | A1* | 8/2017 | Mullins | G06T 7/55 |
| 2017/0255450 | A1* | 9/2017 | Mullins | G06T 19/00 |
| 2017/0270362 | A1* | 9/2017 | Barnehama | G06T 19/003 |
| 2017/0337897 | A1 | 11/2017 | Jung et al. | |
| 2018/0033177 | A1 | 2/2018 | Han et al. | |
| 2018/0218538 | A1* | 8/2018 | Short | G06T 19/006 |
| 2018/0253900 | A1* | 9/2018 | Finding | G02B 27/017 |
| 2018/0330531 | A1* | 11/2018 | Mullins | B60R 1/00 |
| 2018/0373412 | A1* | 12/2018 | Reif | G06F 3/04815 |
| 2019/0018498 | A1* | 1/2019 | West | G06F 3/0346 |
| 2019/0129595 | A1* | 5/2019 | Perl | G06F 3/04815 |
| 2019/0138880 | A1* | 5/2019 | Akella | G06K 9/00335 |
| 2019/0155397 | A1* | 5/2019 | Liu | G02B 27/017 |

FOREIGN PATENT DOCUMENTS

| | | |
|---|---|---|
| CN | 107111370 A | 8/2017 |
| CN | 107250891 A | 10/2017 |
| JP | 2005252735 A | 9/2005 |
| JP | 2017102732 A | 6/2017 |
| KR | 1020170129509 A | 11/2017 |
| KR | 1020180014492 A | 2/2018 |
| WO | 2013028908 A1 | 2/2013 |
| WO | 2014209706 A1 | 12/2014 |
| WO | 2016014877 A1 | 1/2016 |
| WO | 2017171649 A1 | 10/2017 |

OTHER PUBLICATIONS

ISA/KR, "International Search Report and Written Opinion of the International Searching Authority," International Application No. PCT/KR2018/015315, dated Mar. 13, 2019, 9 pages.

Communication pursuant to Article 94(3) EPC in connection with European Application No. 18210466.1 dated Aug. 21, 2020, 6 pages.

Communication pursuant to Article 94(3) EPC dated May 7, 2021 in connection with European Patent Application No. 18 210 466.1, 3 pages.

The First Office Action dated Sep. 3, 2021, in connection with Chinese Application No. 201880078909 5, 22 pages.

* cited by examiner

SYSTEM AND METHOD FOR TRANSITION BOUNDARIES AND DISTANCE RESPONSIVE INTERFACES IN AUGMENTED AND VIRTUAL REALITY

CROSS-REFERENCE TO RELATED APPLICATION AND CLAIM OF PRIORITY

This application claims priority under 35 U.S.C. § 119(e) to U.S. Provisional Patent Application No. 62/595,052 filed on Dec. 5, 2017. The above-identified provisional patent application is hereby incorporated by reference in its entirety.

TECHNICAL FIELD

This disclosure relates generally to the field of systems and methods for augmented reality. More specifically, this disclosure relates to transition boundaries for distance-responsive interfaces for augmented reality.

BACKGROUND

In augmented reality a user can move around in a real environment. The user moves closer and further from virtual content or objects present in the augmented environment. Moving closer and further from virtual content changes the legibility of the virtual objects due to their perceived distance from the user. Additionally, a user's interaction with a virtual object can also be different depending on the perceived distance between the user and the virtual object. One existing technique for handling virtual objects that change usefulness to a user based on the distance between the user and the virtual object is to change the content of the virtual object based on its distance from the user. For example, different zones can be established to represent different distance ranges such as a near-to-object zone and a far-from-object zone. The near and far zones can be separated by a transition boundary. When the distance between the user and the object is in the near-to-object zone, near-oriented virtual content is displayed for the virtual object. When the distance between the user and the object is in the far-from-object zone, far-oriented virtual content or no virtual content can be displayed for the virtual content. If the user is standing on or very close to the transition boundary between the zones, and given the natural movements of a user's head or body and distance measuring variability, the AR system could continuously trigger or toggle between the near and the far zone virtual content representations of the virtual object. Continuous toggling or flickering between virtual content representations can be distracting to the user and make the AR experience less interesting due to the distraction.

SUMMARY

This disclosure provides a system and method for augmented reality.

In a first embodiment, a head mountable device (HMD) is provided. The HMD has a display panel, a depth sensor and at least one processor coupled to the display panel and the depth sensor. The at least one processor is coupled to the display panel and the depth sensor. A memory, coupled to the at least one processor, includes instructions executable by the least one processor. The instructions cause the least one processor to set a first transition distance (TD) at a first distance from the HMD. The instructions further cause the at least one processor to set a second TD at a second distance from the HMD, wherein the first TD is less than the second TD. The instruction cause the at least one processor to determine, based on data from the depth sensor, object distances between the HMD and a real object, wherein the real object is associated with virtual object content. The instructions further cause the at least one processor to compare a previous object distance and a present object distance of the object distances with the first TD and with the second TD. When the previous object distance is greater than the first TD and the present object distance is less than the first TD, the processor is configured to change display of the virtual object content on the display panel to display first information detail of the virtual object content in association with the real object. When the previous object distance is less than the second TD and the present object distance is greater than the second TD, the processor is configured to change display of the virtual object content on the display panel two display second information detail of the virtual object content in Association with the real object.

In a second embodiment, a method for transitioning virtual content in augmented reality is provided. The method includes setting a first transition distance (TD) at a first distance from a head mountable display (HMD) and setting a second TD at a second distance from the HMD, wherein the first TD is less than the second TD. The method further includes determining, based on data from a depth sensor, object distances between the HMD and a real object, the real object being associated with virtual object content. The method compares a previous object distance and a present object distance of the determined object distances with the first TD and with the second TD. When the previous object distance is greater than the first TD and the present object distance is less than the first TD, then the method includes changing display of the virtual object content on a display panel of the HMD to displaying first information detail of the virtual object content in association with the real object. When the previous object distance is less than the second TD and the present object distance is greater than the second TD, then the method includes changing display of the virtual object content on the display panel of the HMD to displaying second information detail of the virtual object content in association with the real object.

In a third embodiment, a non-transitory computer-readable medium comprising program code for augmented reality is provided, that when executed by at least one processor, causes an electronic device to set a first transition distance (TD) at a first distance from a head mountable device (HMD) and set a second TD at a second distance from the HMD, wherein the first TD is less than the second TD. Electronic device is further caused to determine, based on data from a depth sensor, object distances between the HMD and a real object. The real object is associated with virtual object content. The electronic device is also caused to compare a previous object distance and a present object distance of the determined object distances with the first TD and with the second TD. When the previous object distance is greater than the first TD and the present object distance is less than the first TD, the electronic device changes display of the virtual object content on a display panel of the HMD to display first information detail of the virtual object content in Association with the real object. When the previous object distance is less than the second TD and the present object distance is greater than the second TD, the electronic device changes display of the virtual object content on the display panel of the HMD to display second information detail of the virtual object content in association with the real object.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA)

device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 12C, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
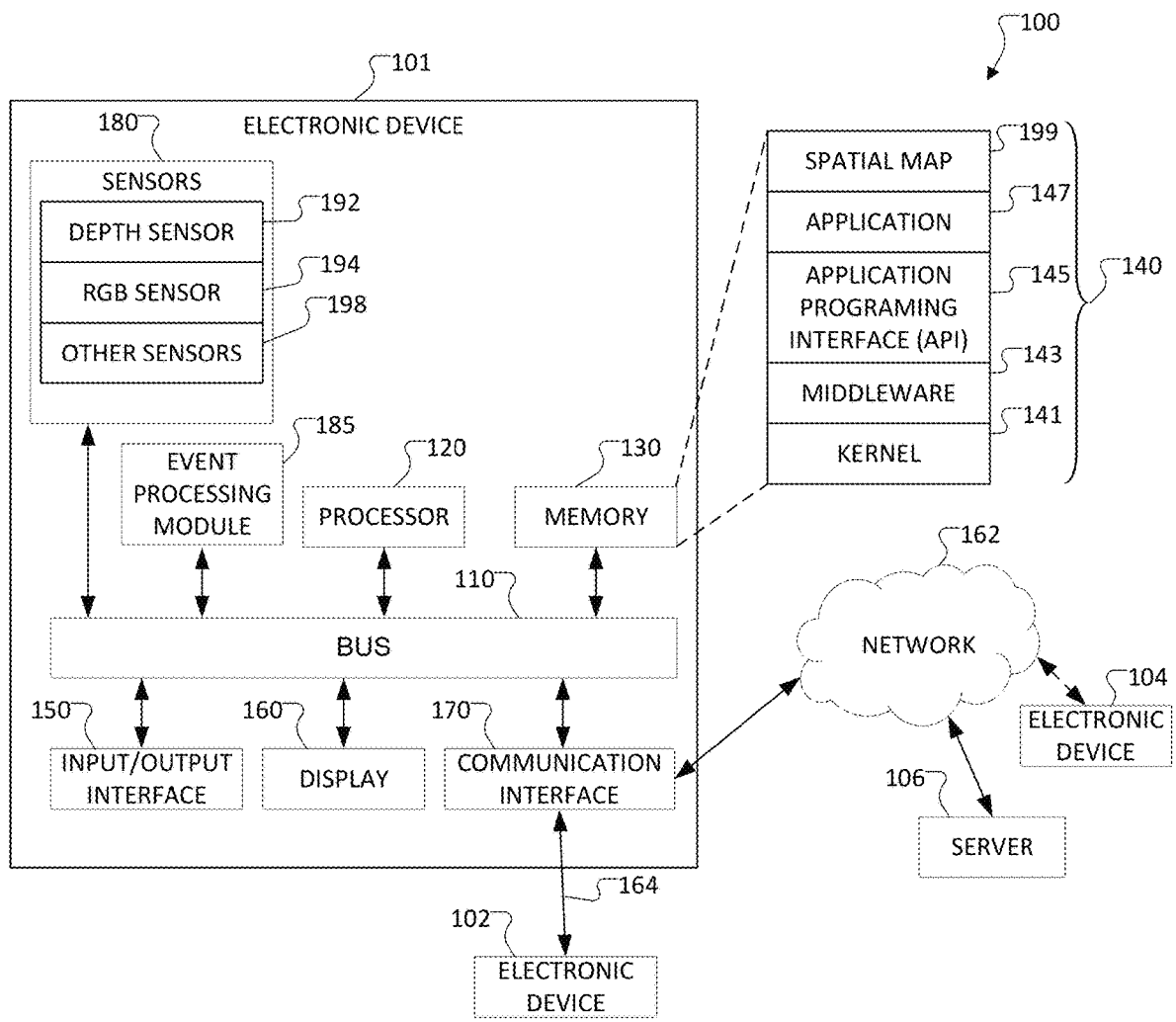
FIG. 1 illustrates an example network configuration according to various embodiments of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (10) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc.

The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The first external electronic device 102 or the second external electronic device 104 can be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the event processing server module can include at least one of the components of the event processing module 185 and perform (or instead perform) at least one of the operations (or functions) conducted by the event processing module 185.

The event processing module 185 can process at least part of information obtained from other elements (e.g., the processor 120, the memory 130, the input/output interface 150, or the communication interface 170) and can provide the same to the user in various manners.

For example, according to an embodiment of the present disclosure, the event processing module 185 processes information related to an event, which is generated while the electronic device 101 is mounted in a wearable device (e.g., the electronic device 102) to function as a display apparatus and to operate in the virtual reality mode, to fit the virtual reality mode and display the processed information. When the event generated while operating in the virtual reality mode is an event related to running an application, the event processing module 185 can block the running of the application or process the application to operate as a background application or process. Additional information on the event processing module 185 may be provided through FIG. 2 described below.

Although in FIG. 1 the event processing module 185 is shown to be a module separate from the processor 120, at least a portion of the event processing module 185 can be included or implemented in the processor 120 or at least one other module, or the overall function of the event processing module 185 can be included or implemented in the processor 120 shown or another processor. The event processing module 185 can perform operations according to embodiments of the present disclosure in interoperation with at least one program 140 stored in the memory 130.

Figure 2:
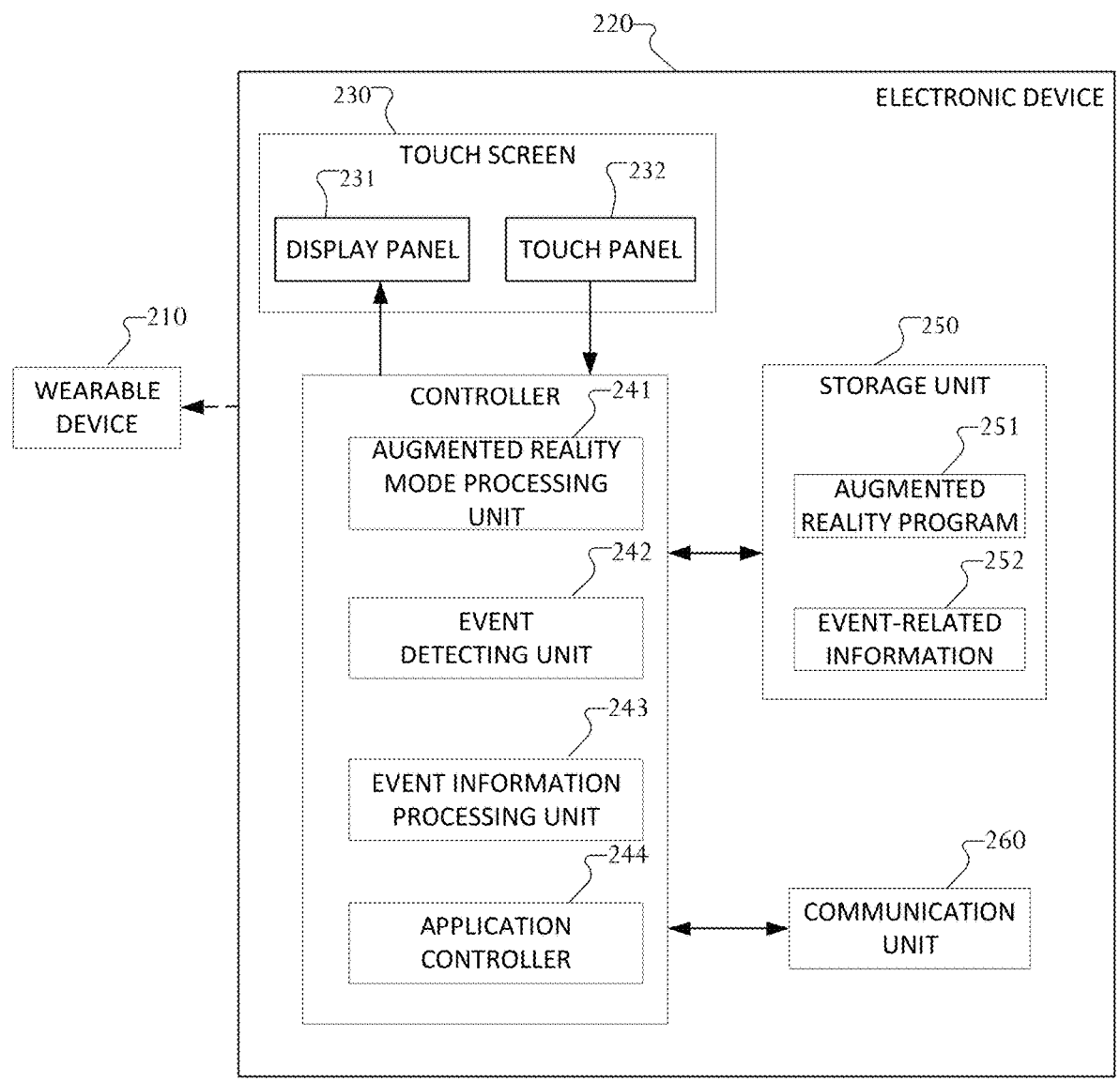
FIG. 2 illustrates an example electronic device according to this disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to an embodiment of the present disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

For example, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to an embodiment of the present disclosure, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to an embodiment of the present disclosure, when the electronic device 220 is operated in the augmented reality mode, the controller 240 can control the processing of information related to an event generated while operating in the augmented reality mode to fit in the augmented reality mode and display the processed information. According to an embodiment of the present disclosure, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to an embodiment of the present disclosure, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to an embodiment of the present disclosure, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to an embodiment of the present disclosure, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to an embodiment of the present disclosure, the electronic device 220 can be denoted as a first device (or a first electronic device), and the wearable device 210 may be denoted as a second device (or a second electronic device) for ease of description.

According to an embodiment of the present disclosure, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to an embodiment of the present disclosure, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to an embodiment of the present disclosure, the electronic device further comprises a storage unit configured for storing the event-related information when the event is not an event to be displayed in the augmented reality mode, wherein the controller can perform control to display the event-related information stored in the storage unit when the electronic device switches from the augmented reality mode into a see-through mode.

According to an embodiment of the present disclosure, the electronic device can further comprise a storage unit that stores information regarding at least one event to be displayed in the augmented reality mode.

According to an embodiment of the present disclosure, the event can include an instant message reception notification event.

According to an embodiment of the present disclosure, when the event is an event related to running at least one application, the controller can perform control that blocks running of the application according to occurrence of the event.

According to an embodiment of the present disclosure, the controller can perform control to run the blocked application when a screen mode of the electronic device switches from a virtual reality mode into an augmented or a see-through mode.

According to an embodiment of the present disclosure, when the event is an event related to running at least one application, the controller can perform control that enables the application, according to the occurrence of the event, to be run on a background of a screen of the augmented reality mode.

According to an embodiment of the present disclosure, when the electronic device is connected with a wearable device, the controller can perform control to run the augmented reality mode.

According to an embodiment of the present disclosure, the controller can enable the event-related information to be arranged and processed to be displayed in a three dimensional (3D) space of the augmented reality mode screen being displayed on a current display screen.

According to an embodiment of the present disclosure, the electronic device can include additional sensors such as one or more red, green, blue (RGB) cameras, dynamic vision sensor (DVS) cameras, 360 degree cameras, or a combination thereof.

Figure 3:
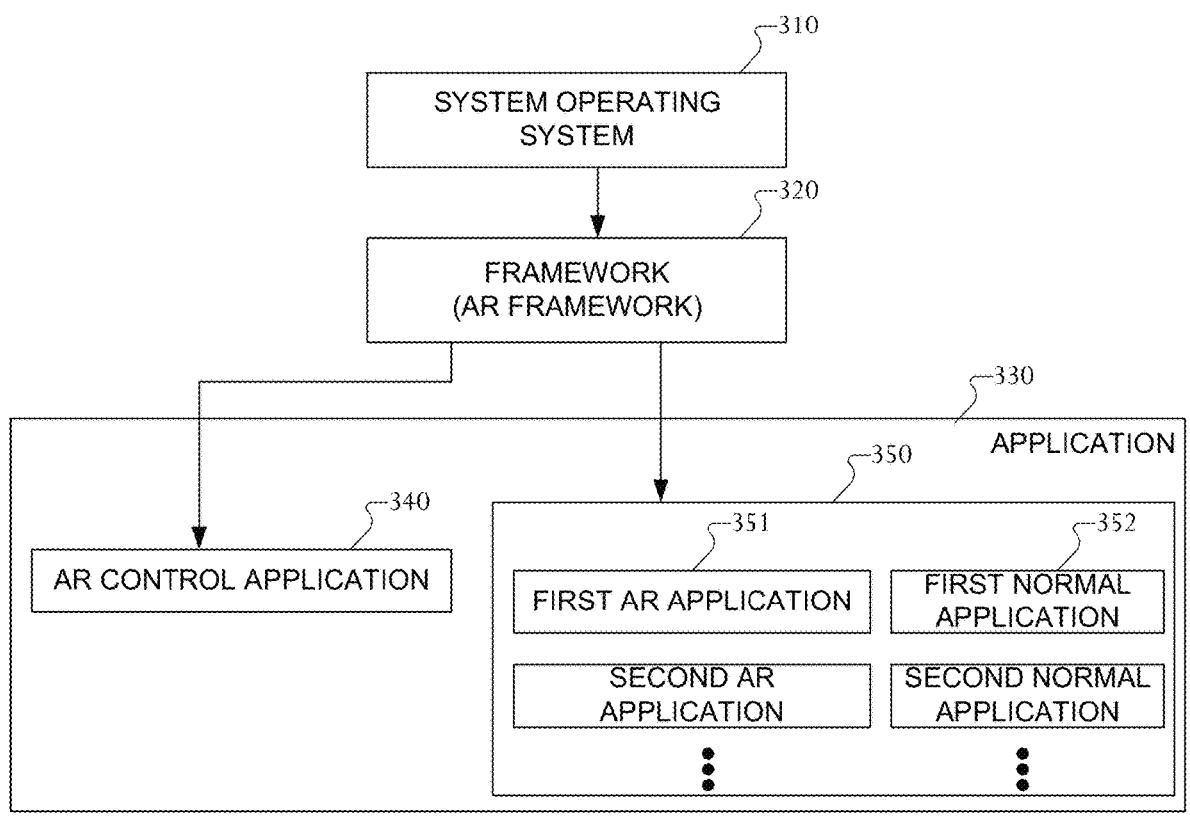
FIG. 3 is a block diagram illustrating a program module according to this disclosure.

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, embodiments of the present disclosure apply equally to a virtual reality (VR) and the augmented reality (AR). Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to an embodiment of the present disclosure, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application 330 can include a plurality of applications and can include at least one AR application 351 running in the virtual reality mode and at least one normal application 352 running in a normal mode, which is not the virtual reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the normal mode, but not in the virtual reality mode. When there is an application to be run in relation with the event occurring in the normal mode, the framework 320 can perform or provide control to run at least one normal application 352.

According to an embodiment of the present disclosure, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to an embodiment of the present disclosure, when an event occurs while operating in the augmented reality mode, the framework 320 can perform control to block the running of at least one normal application 352 related to the occurring event.

According to an embodiment of the present disclosure, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to an embodiment of the present disclosure, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

The HMD can generate an augmented reality environment in which a real-world environment is rendered with augmented information. The HMD can be an opaque, transparent, semi-transparent or reflective device. For example, the HMD can be an electronic device with a camera or camera input configured to capture real-world information and display the real-world information on display, such as LCD, LED, AMOLED, or the like. The real-world information captured by the camera can be rendered as a video image on the display with augmented information. Alternatively, the HMD can include a transparent or semi-transparent display in which a user is able to see real-world information through the transparent or semi-transparent display while augmented information is also rendered on the transparent or semi-transparent display. In certain embodiments, the HMD includes a reflective display in which real-world information or augmented information is reflected onto a display surface disposed in a viewing area for the user.

Pinning has become an essential feature of AR experiences. Pinning provides the ability to anchor virtual content to a geographic location or an object in the real world. Some application content is better experienced when it is pinned to a real location or object in a real environment. For example a user could pin their video player application to their real world television or pin their music player application to their Internet-of-Things (IoT) speaker. Thus, when the user views their television or IoT speaker, an appropriate video player or music player application is displayed either on the HUD or in the environment and respectively associated with the television or IoT speaker.

Additionally, developers can create responsive applications, such that the content of each application has different representations depending on whether the content is to be displayed on the HUD or to be pinned to an object in the real world. If the content is pinned, developers can create different virtual content representations based on how close the user is to the associated real world object.

Users are able to pin applications that show content on the HUD of the AR HMD. In one embodiment, an application may rely on pinning as a core experience aspect of the application. For example, a furniture retailer may provide an application for the user to run in the user's AR HMD device while perusing the retailer's showroom. The retailer's application can utilize a fixed window displayed on the HUD where a user can selected and place images of the selected furniture for purchase or comparison as the user walks through the furniture store. The application can ask the user to pin the window on the HUD at the beginning of the application experience. Thus, as the user walks around the store a pinned window on the HUD helps the user keep track of furniture of interest. Additionally, each piece of furniture in the showroom may have pinned content describing the furniture's features and price.

As an alternative to applications, users may also pin widgets to real world objects in their environment. Widgets are pieces of application content that can be tied to the real world. For example, a navigation application can have a next direction instruction widget posted on the HUD along with a direction arrow that is pinned to a location in the real world or environment as viewed through the AR display of the HMD. There could also be the widget that shows travel times, which the user could pin to their desk or on a wall next to their front door. The travel times widget could display the expected amount of time will take the user to get from their present location to various other locations such as, work, a selected friend's house, a favorite restaurant or a nearby movie theater. Optionally the entire application may be included within the widget.

In one embodiment, widgets can be placed infinitely and operate simultaneously, but the number of apps that can open at a time may be limited.

In various embodiments there can be multiple ways that a user can activate the pinning mode. A user may be able to use their voice to activate the pinning mode. For both HUD focused applications and widgets, users can use voice commands to pin and unpin content to a real world object or location. The user may be provoked by an application to pin a virtual object or content. An application may showcase or display one or more available widgets that the user can pin. When the user sees an appropriate real world location or object that is appropriate for pinning a selected widget, the user can do so when the real world object or location is in the focus or gaze of the user. Another way that a user can activate is with a widget manager. A widget manager may be similar to other applications that provide widgets, such as an intelligent assistant main page, SIRI widgets, or GOOGLE NOW. A widget manager can allow the user to scroll through all the available widgets on a mobile device or HMD device and pin them to real world objects or locations at the user's convenience.

In various embodiments, pinning may be performed according to the following flow. First, the user activates the pinning mode on the AR HMD device. Second, application content or widget previews may be presented as floating pinnable content in the environment viewed through the AR display screen and in front of the user at a predetermined or fixed distance as the user walks or moves around. The system, the application that is running, or the widget manager queries the user via comments displayed on the HUD or via the intelligent assistant to place or pin the content to a real object. If the user is within the threshold distance or predetermined distance from a real world surface or real world object in focus, the pinnable content snaps to that real world surface's orientation. In the event that there are not enough visual features, as viewed by the HMD camera, to reliably pin the content to the location selected by the user, an error message or icon may be shown on the HUD that helps guide the user to place the pinnable content to an acceptable real world spot, location, surface or geographically determined place. After the real world spot is acceptable, the user can tap or use a voice command to pin the content to the location.

In various embodiments a passive pinning technique may also be available. With passive pinning a launched application can access a set of surfaces or real world locations available for use as a pinning location. This allows for passive pinning. For example, if a user is using a biking application inside their house while using AR, the AR HMD camera may determine an available surface, like a bar wall or table top, for pinning. The biking app can assess the surface and place auxiliary virtual information on it, such as a virtual topographical map of recent bicycle rides or for planning a future bicycle route.

Allowing an AR application or the system to take over the environmental view or HUD can create a dangerous situation for the user. Partially blocking or creating a distraction in a user's visual space in certain circumstances or real-world environments is not desirable to a user. As such, various features can be built into embodiments of an AR system to help make the AR device and system safer in certain circumstances. Such features can provide a user additional control so that content can be quickly removed from the HUD, the environment and the user's field of view. In various embodiments, such features can include a "quick turn" feature wherein if the user who is wearing an AR HMD device quickly turns his head, the displayed HUD contents and virtual objects can dim to either be partially or completely transparent. This allows the user to see through the AR display and have a clear vision of the full field of view. Some embodiments can include a "sleep gesture" feature. A sleep gesture feature responds when the user performs a particular gesture which puts the AR device to sleep or into standby mode. For example, the quick gesture could be a two finger swipe in a predetermined direction on the trackpad. Other embodiments can include a specific intelligent assistant command that turns off or puts the AR device to sleep upon hearing the specific verbal command. Another feature in various embodiments can be a "speed feature". The speed feature can put the AR device to sleep, turn the device off, or make any or all displayed elements transparent on the display if the user is moving at a velocity or speed over a predetermined speed threshold. Instructions by the user can be disallowed and various predefined interactions by the user may also be disallowed. The user can be prompted with a warning notification or the device can be put in a special mode, for example into a driving mode, when the speed feature determines that the devices moving above a predetermined threshold speed.

In various embodiments, distance-responsive content can be displayed on the HUD or in the environment by an AR device. As a user of an AR HMD device moves closer to or further away from a virtual object or a real object with associated virtual content, the legibility or usability of an interface associated with the virtual or real object can be changed relative to the distance between the AR HMD device and the real or perceived distance between the virtual or real object. In various embodiments, a virtual object or real object can be configured to be responsive based on a virtual or actual distance between the object and the AR HMD. For example, a UI associated or pinned to a real or virtual object that is a long distance away from the user may not be of interest to the user until the user is close enough to assess the environment proximate to the UI.

Figure 4:
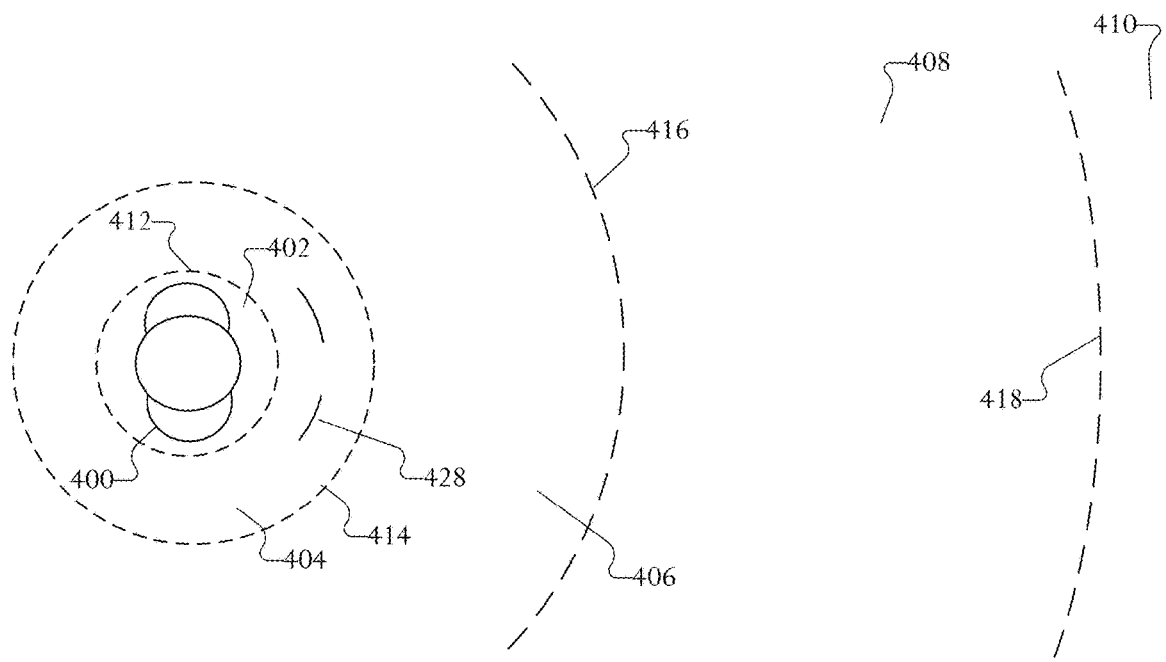
FIG. 4 illustrates content responsive concentric zones with non-visible transition boundary separations about a AR HMD device according to this disclosure.

FIG. 4 depicts a plurality of concentric zones of responsive content having different distances from a wearer of AR HMD device. Depicted are five general distance zones. The five zones concentrically positioned about a user wearing HMD device 400 can be referred to as a safe zone 402, a near zone 404, a medium zone 406, a far zone 408 and a beyond zone 410. In various embodiments, the range of distance between a user of the AR HMD device 400 and a safe-near transition boundary 412 can define a safe zone 402. A near zone 404 can be defined as being within the range of distance from the AR HMD device 400 that is between the safe-near transition boundary 412 and the near-medium transition boundary 414. The medium zone 406 can be defined as being within the range of distance from the AR HMD device 400 that is between the near-medium transition boundary 414 and the medium-far transition boundary 416. The far zone 408 can be defined as being within the range of distance from the AR HMD device 400 that is between the medium-far transition boundary 416 in the far-beyond transition boundary 418. The beyond zone 410 can be defined as being a distance from the AR HMD device 400 that is greater than the distance between the XR HMD device 400 and the far-beyond transition boundary 418. The Concentric Rings and Response Content Chart below describes various example distance zones of responsive content. In the example shown in FIG. 4, the HUD 428 is rendered in the near zone 404.

Concentric Rings and Response Content Chart

| Name of Zone | Purpose | Approximate Outward Border | Set By |
|---|---|---|---|
| Safe | User-defined safe zone (e.g., personal bubble) that clips any virtual objects | 6 inches | User, manufacturer may provide a default |
| Near | Space for HUD and graspable interfaces | Arms-length, but within grasping distance of the user, between 20 and 40 inches | Manufacturer of the AR, VR or XR device |
| Medium | Information elements, reduced content interactions, expected to be used more while inside a real structure | Far side of a room, 15 to 40 feet | Application |
| Far | Informational elements, expected to be used more when in an outdoor environment | Farsighted field, far side of a parking lot, 100 to 4000 feet | Application |
| Beyond | The distance beyond far, expected to be rarely used | Infinity, ∞ | Application |

Figure 5:
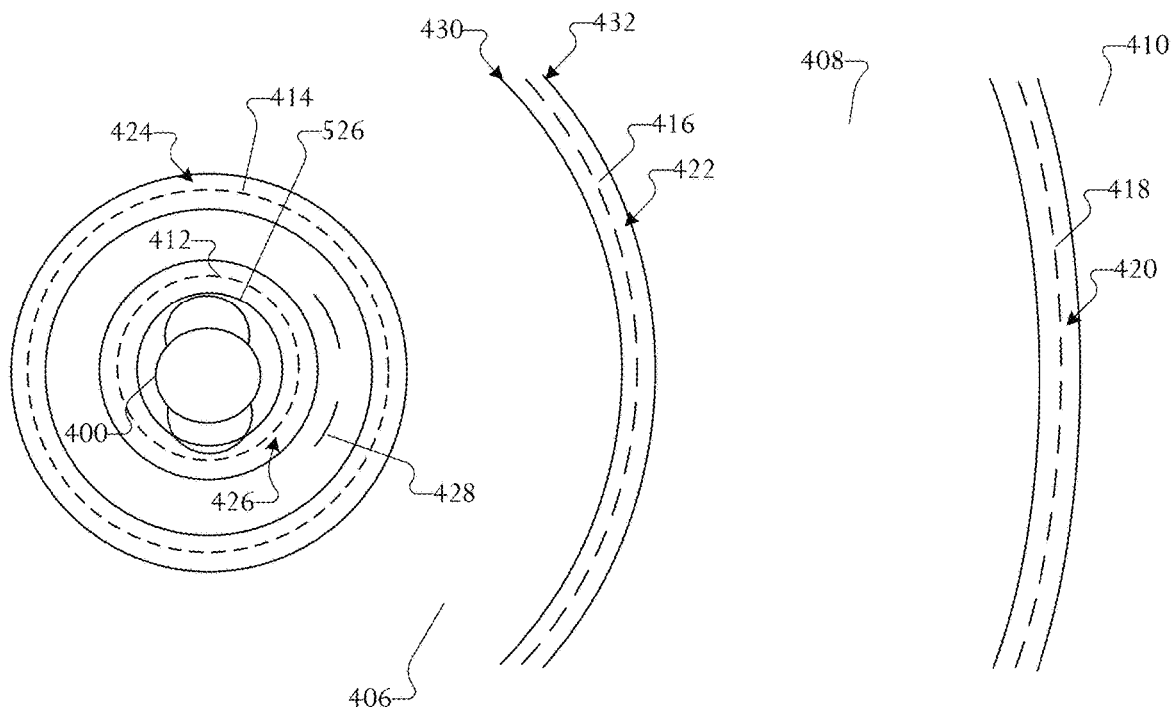
FIG. 5 illustrates transition zones about non-visible transition boundaries according to this disclosure.

FIG. 5 shows transition zones (also referred to herein as "tzones") about each of the transition boundaries that separate the content zones. When a user is wearing an AR HMD device the user moves about a geographical area. As the distance between the AR HMD device and a real or virtual object changes, the UI associated with the real or virtual object may animate or transition to a different state to display different content to the user associated with the real or virtual object. In various embodiments, the UI associated with a real or virtual object may a make transition from providing less detailed to a more detailed UI as the distance between the object and the AR HMD device decreases (i.e., moves closer) to be within the far-beyond tzone 420, the medium-far tzone 422, and the near-medium tzone 424. In various embodiments when the object crosses the safe-near tzone 426, the virtual object is clipped or removed from the AR display screen/environment as it is too close to the user in the safe zone 402 The close transition boundary (CTB) 430 and far transition boundary (FTB) 432 of, for example, the medium-far tzone 422 may be utilized based on whether the distance between the virtual object and the AR HMD device is getting larger (i.e. moving away from each other) or getting smaller (i.e. getting closer to each other).

Figure 6A:
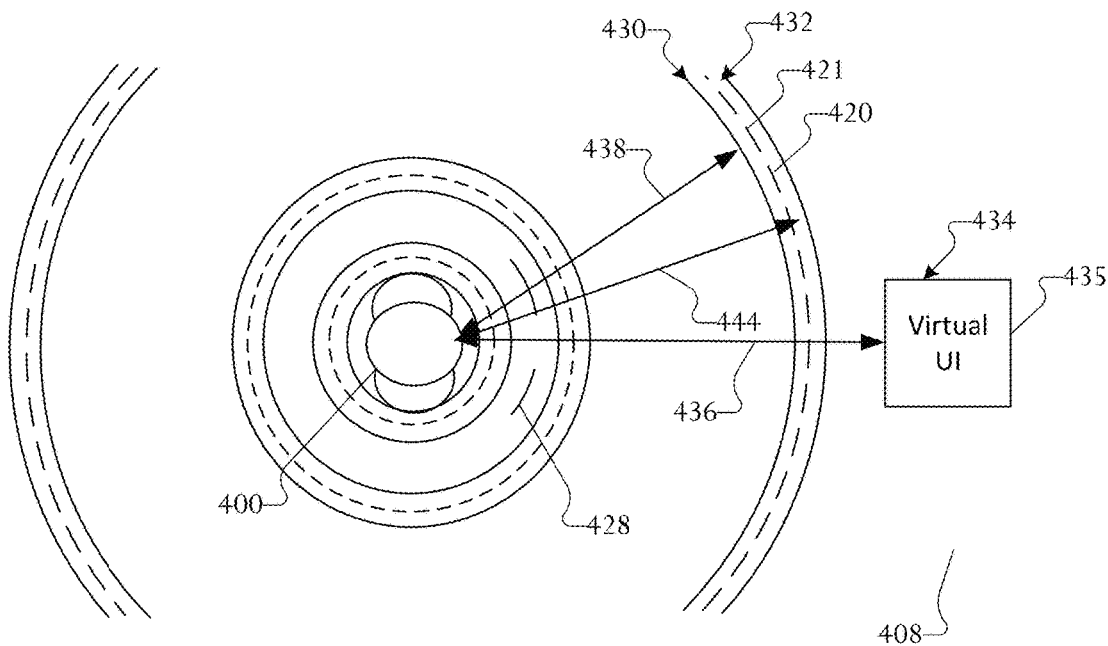
FIGS. 6A, 6B and 6C illustrate how close and far transition boundaries of a transition boundary zone are used to adjust graphic content of a virtual object according to this disclosure.
Figure 6B:
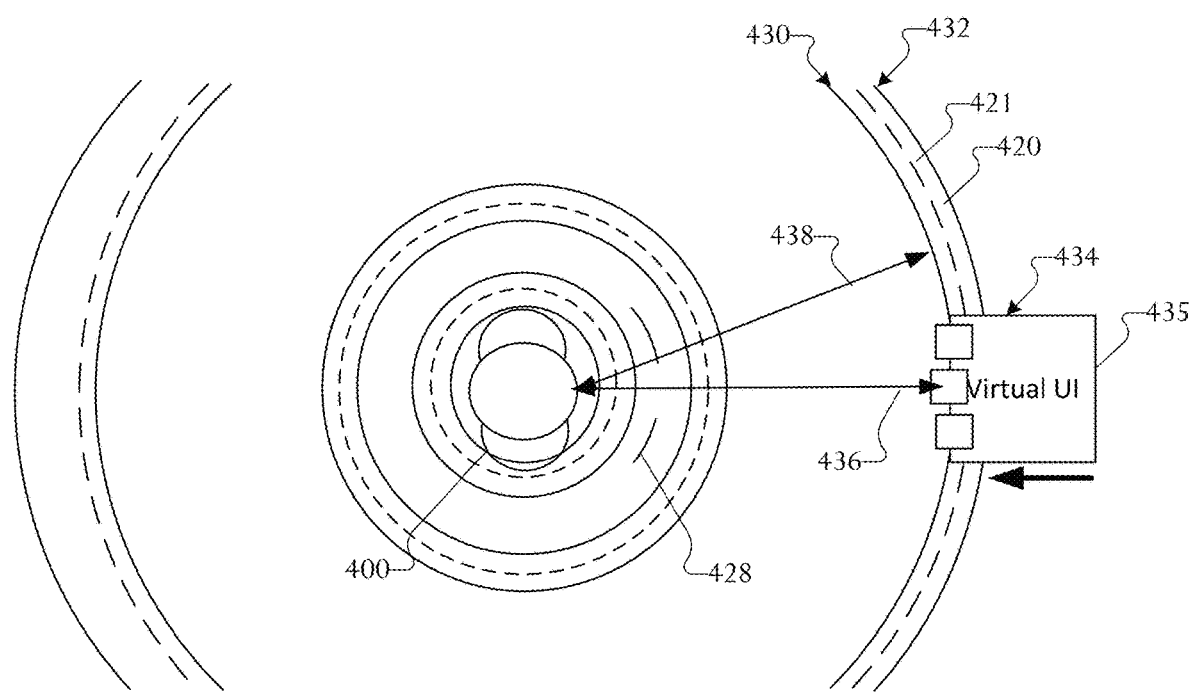
Figure 6C:
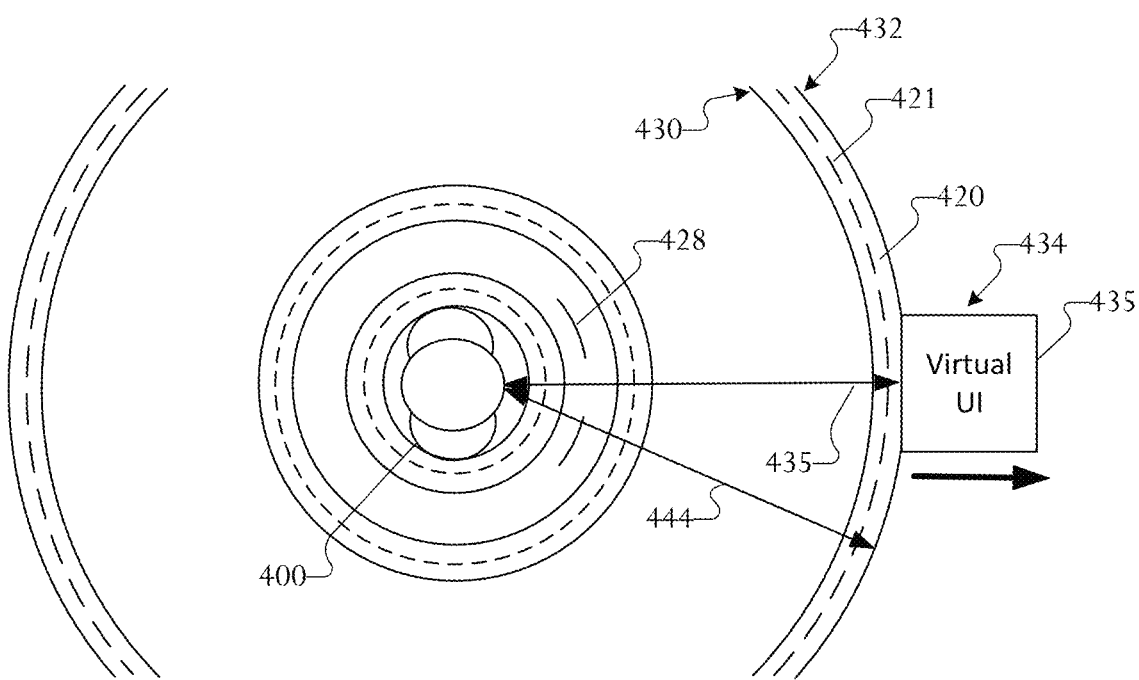

FIGS. 6A, 6B and 6C show how the close and far transition boundaries of a transition boundary zone are used to adjust graphic content of a virtual object. In FIG. 6A a virtual object 434 is determined by sensors of the VR device to be to be in the far zone 408. The VR device determines that the distance to the object (the "object distance") 436 is greater than the distance to the medium-far transition boundary 422. The virtual object 434 may be pinned to or associated with a real object that is presently in the far zone 408. As the distance between the user wearing the AR HMD 400 and the virtual and/or associated real object decreases (i.e., the AR HMD 400 moves closer toward the real object), a depth sensor or distance sensor on the HMD takes consecutive object distance readings indicating that the object distance 436 is decreasing.

In FIG. 6B, the object distance between the AR HMD 400 and the virtual object 434 is less than a previously determined or last determined object distance 436 and also less than the close transition boundary distance (CTBD) 438 of the medium-far transition boundary zone 422. Thus, when the user moves toward the real object or virtual object 434 and the distance between the user and the virtual object (i.e. the object distance 436) becomes less than the CTBD 438, then the virtual object 434 is transitioned by the AR device processor from being displayed with less content detail to being displayed as a virtual object 434 with more detailed content. As the virtual object gets closer to the user and crosses the close transition boundaries (CTBs) of a next closer transition boundary, in various embodiments, the virtual object is displayed to the user on the AR display with more content detail (not specifically shown). For example, if the virtual object 434 is a UI, when the UI is in the far zone 408 and too far away to be useful to the user, the UI may not be displayed with much more detail than being a user interface or the UI may not be displayed at all. When the virtual object 434 is perceived as close enough to the user to be useful, then the UI is displayed with more detail so that the user can interact with the UI.

To avoid a potential flickering effect of the virtual object transitioning back and forth between the medium content 440 in the far content 435 of the virtual object 434, if the user lingers at an object distance that is substantially the same as the CTB 421 of the, for example, medium-far transition boundary zone 422, embodiments only transition from far content 435 to medium content 440 of the virtual object 434 when the virtual object 434 and the AR HMD are moving closer together and cross the CTB 430.

In order for the virtual object 434 to transition from the medium content 440 to the far content 435, the AR HMD 400 and the virtual object 434 must be moving away from each other as measured by consecutive object distance measurements 436. The virtual object (and/or the real object) was crossed the FTB 432 such that the object distance 436 becomes greater than the far transition boundary distance (FTBD) 444 as shown in FIG. 6C.

Figure 7:
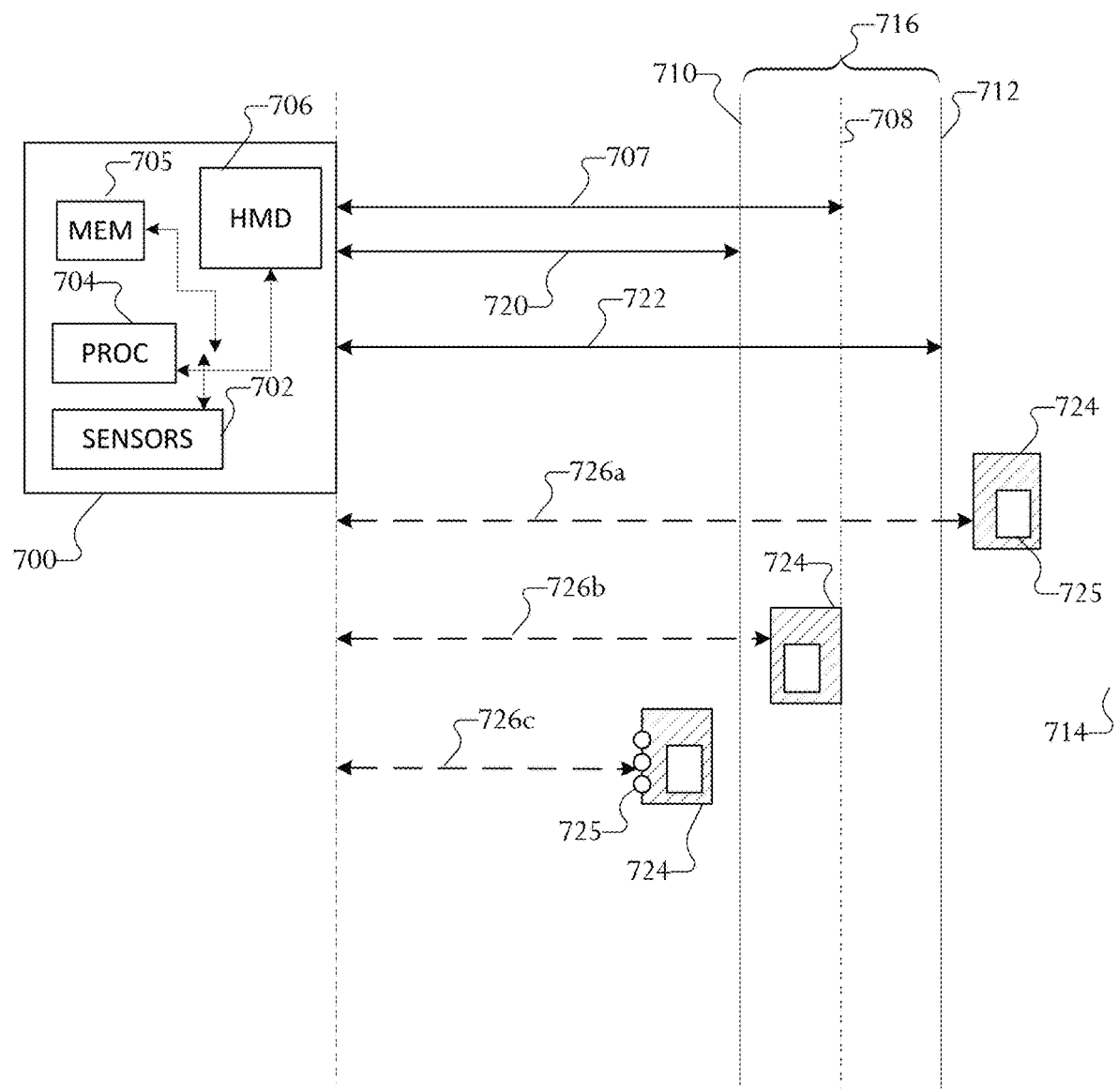
FIG. 7 illustrates an AR HMD device sensing a real object associated with virtual content wherein the virtual content transitions when crossing close and far transition boundaries according to this disclosure.

FIG. 7 illustrates an AR HMD device sensing a real object 724 associated with virtual content that transitions between more and less detailed content in accordance with an embodiment of this disclosure. As with other figures in this disclosure, the embodiment shown in FIG. 7 is for illustration only. Other embodiments could also be used without departing from the scope of this disclosure.

In various embodiments, the AR HMD device 700 of FIG. 7 can be a device as discussed in FIGS. 1, 2 and 3. An XR HMD device in accordance with embodiments of this disclosure can also include a display panel for displaying AR or VR objects as well as HUD content. Additionally, the AR HMD 700 can include one or more sensors, such as a camera, a GPS sensor, and a distance or depth determining sensor as part of the sensors 702, 180. Each sensor can provide sensed data or information to the controller or processor 704 of the AR electronic device 101, 102, 210, 220, 700.

The depth or distance sensor can determine distance between the AR device 700 and a real object. For example, a distance sensor can determine a distance between the AR HMD and a real object that is in a user's field of view (FOV). The distance sensor and processor 704 can determine a non-visible transition boundary distance 707 between the AR device 700 and a non-visible transition boundary 708. The non-visible transition boundary distance 707 can be preset as discussed with respect to FIG. 4. A non-visible transition boundary (TB) 708 has in its proximity a close transition boundary (CTB) 710 and a far transition boundary (FTB) 712. The CTB 710 is between the non-visible TB 708 and the AR HMD device 700. The FTB 712 is between the non-visible boundary 708 and the beyond zone 714. Together the CTB 710 and the FTB 712 establish a transition zone (tzone) 716 wherein a close transition boundary distance (CTBD) 720 is a predetermined or set distance between the AR HMD 706 and the CTB 710 and a far transition boundary distance (FTBD) 722 is a predetermined or set distance between the AR HMD 706 and the FTB 712. The CTBD 720 is less than the non-visible transition boundary distance 707 (also referred to as the tzone distance), which is less than the FTBD 722. In various embodiments the CTBD 720 and the FTBD 722 are set based on the tzone distance 707. The tzone distance in various embodiments can be set by one or more of the augmented reality application program, the HMD or by user input. The CTBD and FTBD can be preset or adjustably set as relative distances from the non-visible transition boundary 708.

As the user moves around, the distance between the AR HMD 706 and a real object 724, the virtual content 725 associated or pinned to the real object 724 can change. The distance sensor provides data to the processor to determine consecutive distance measurements between the AR HMD 706 and the real object 724. The distance measurement may be stored in a memory 705. The processor 704 compares the last determined consecutive object distance between the AR HMD 706 and the real object 724 with both the CTBD 720 and the FTBD 722 to determine where the real object 724 is positioned in relation to the transition zone 716 of the transition boundary 708. The processor also uses the consecutive object distance measurements to determine whether the AR HMD 706 and the real object 724 are getting closer or further away from each other. In various embodiments, the processor determines the relative directions, accelerations and velocities of the AR HMD 706 with respect to one or more real objects that are being monitored.

In order to avoid a flickering effect of virtual content of the virtual object associated with the real object 724 as it is idle, yet appears to cross crosses back and forth over the non-visible transition boundary 708, embodiments utilize the CTB 710 and FTB 712 of the transition zone 716 so that the virtual content of the virtual object 725 associated with the real object 724 transitions from less detailed content to more detailed content only when the object distance 2526 between the real object 724 and the AR HMD 706 is decreasing and the real object 724 crosses the CTB 710. Additionally, to avoid the flickering effect embodiments utilize the FTB 712 of the transition zone 716 so that the virtual content of the virtual object 725 associated with the real object 724 transitions from more detailed content to less detailed content only when the object distance 2526 between the real object 724 and the AR HMD 706 is increasing and the real object 724 crosses the FTB 712.

That is, when a last consecutive object distance 726b between the AR HMD 706 and the real object 724 is greater than the CTBD 720 and a present or next determined consecutive object distance 726c is less than the first CTBD 720, then the processor will transition the virtual content associated with the real object 724 to more detailed content of the virtual content from less detailed content because the real object 724 has crossed the transition zone 716 into a zone, such as the medium zone or near zone, that is closer to the user wearing the AR HMD 706.

Additionally, when the last consecutive object distance 726b between the AR HMD 706 and the real object 724 is less than the FTBD 712 and a present or next determined consecutive object distance 726a is greater than the FTBD 712, the processor will transition the virtual content associated with the real object 724 to less detailed content of the virtual content from more detailed content because the real object 724 has crossed the transition zone 716 into a zone, such as the medium zone or far zone that is further from the user wearing the AR HMD 706.

In various embodiments the non-visible TB 708 is within a tzone 716. The CTBD 720 and the FTBD 712 are distances that are based on or derived from the TBD or tzone distance 707. In various embodiments, the tzone 716 boundaries CTB 710 and FTB 712 can be set to be plus/minus predetermined distances relative to or about the non-visible TB 708.

Figure 8:
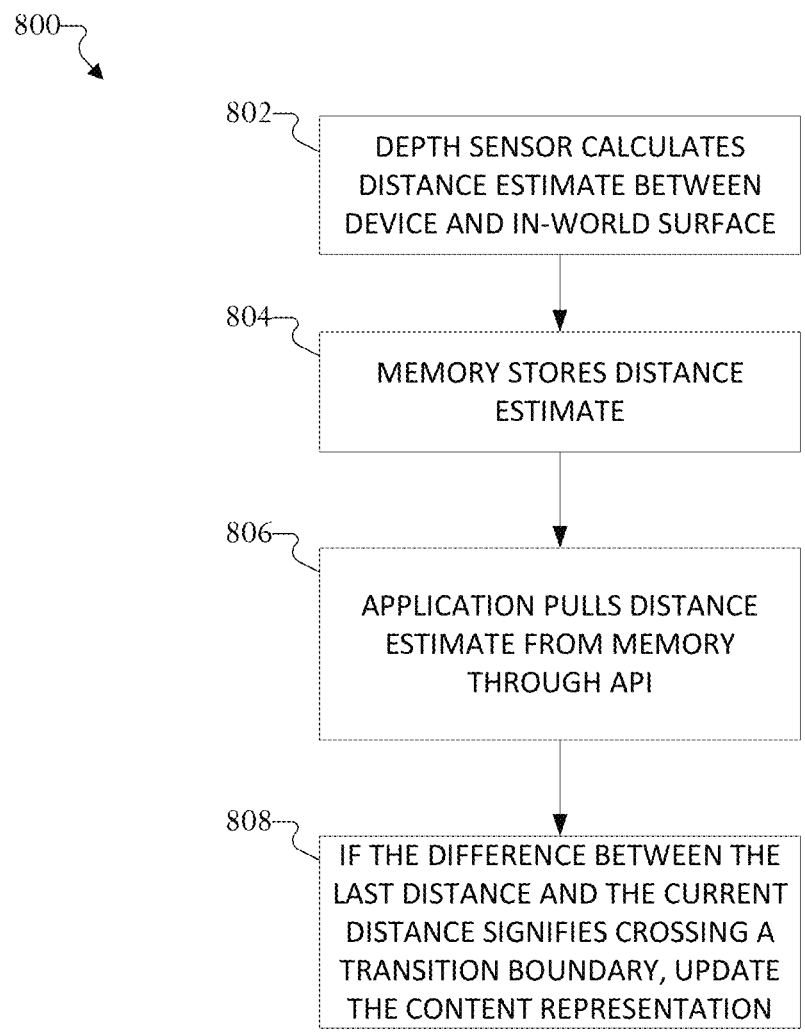
FIG. 8 is a flow chart of a method of transitioning virtual content of a virtual object when crossing a transitions boundary according to this disclosure.

FIG. 8 is an exemplary flowchart of a method 800 of transitioning virtual content of a virtual object when crossing a transition boundary. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example illustrated is implemented by a processor, or processing circuitry in, for example, an electronic device or wearable device such as an augmented reality headset. The method 800 will be discussed while making reference to the devices of FIGS. 1 and 2 and FIGS. 6A, B, C, and FIG. 7.

As shown in FIG. 8, the method 800 begins in operation 802 wherein one or more of the sensors 180, such as a depth, distance or camera sensor associated with the electronic device or HMD device determines a distance between the device and an in-world or real world object 724 that has virtual content associated with it. The determined distance or distance information can be provided to the processor of an electronic device 101, 700. The distance information between the electronic device and the real object 724 may be measured periodically and consecutively for as long as or whenever the real object 724 of interest is in the field of view (FOV) of the user wearing the HMD device.

In various embodiments, the distance measurements between the HMD device and one or more real objects may be tracked periodically as long as the real object is within a predetermined distance from the HMD device. For example, an internet of things (IoT) music speaker that has a virtual UI pinned to it may only have its distance tracked when the HMD device is within a zone of about 20 feet wherein the user can actually see the IoT music speaker. Conversely, an informational sign at an amusement park may have its distance tracked by the HMD starting when the distance between signage and the HMD is in a zone that is 400 or more feet away. To conserve processing time, real objects of interest 724 that are farther from the HMD device, for example, in the beyond zone 410 or medium zone 406 can have their distances measured and determined periodically less frequently than when the object of interest 724 is in the near zone 404 or safe zone 402.

After determining or measuring the distance between the HMD device and real object 724, in operation 804, the distance measurements between the HMD device and the real object 724 are stored in memory 130, 605.

In operation 806 an AR application, for example an application that pins virtual content to real world objects, can pull consecutive present, recent and past distance measurements associated with the real object of interest 724 from memory 130 through an application program interface (API) 145.

In operation 808, the present or most recently measured distance between the HMD device and the real object 724 is compared with the last and/or past measured consecutive distance(s) to determine whether the distance between the HMD device and the real object is increasing or decreasing. Also, if the difference between the last distance and the current/present distance signifies a crossing of a transition boundary, the pinned or associated virtual content is updated to provide more or less content for the user to view via the HUD of the HMD device.

In various embodiments, when the difference between a last object distance and the current object distance is determined, the object distance is the distance between the HMD and the real object. A comparison is made between the last object distance and the current/present object distance to determine whether the object distance is increasing or decreasing. Additionally, a comparison is made between the last object distance and both of a close transition boundary distance (CTBD) 720 and a far transition boundary distance (FTBD) 622 associated with a transition boundary (TB) 708 there between. When the last object distance 726b is greater than the CTBD 720 and the current object distance 726c is less than the CTBD 720, the virtual content associated with the real object is transitioned to virtual content associated with the real object being in a zone between the HMD and the TB 708. Additionally, when the last object distance 726b is less than the FTBD 722 and the current object distance 726a is greater than the FTBD 722, the virtual content associated with the real object is transitioned to virtual content associated with the real object being in a zone further from the HMD than the TB 708.

Thus, a flickering effect caused by having a single transition distance (TBD) 707 is eliminated because transitions of the virtual content associated with the real object don't occur on the TB 708. Instead, for decreasing object distances (i.e., the HMD and the real object getting closer to each other), transitions of virtual content associated with the real object occur when the object crosses the CTB and the object distance becomes less than the CTBD. And, for increasing object distances (i.e., the HMD and the real object are getting further from each other), transitions of virtual content associated with the real object occur when the object crosses the FTB and the object distance becomes greater than the FTBD.

Figure 9:
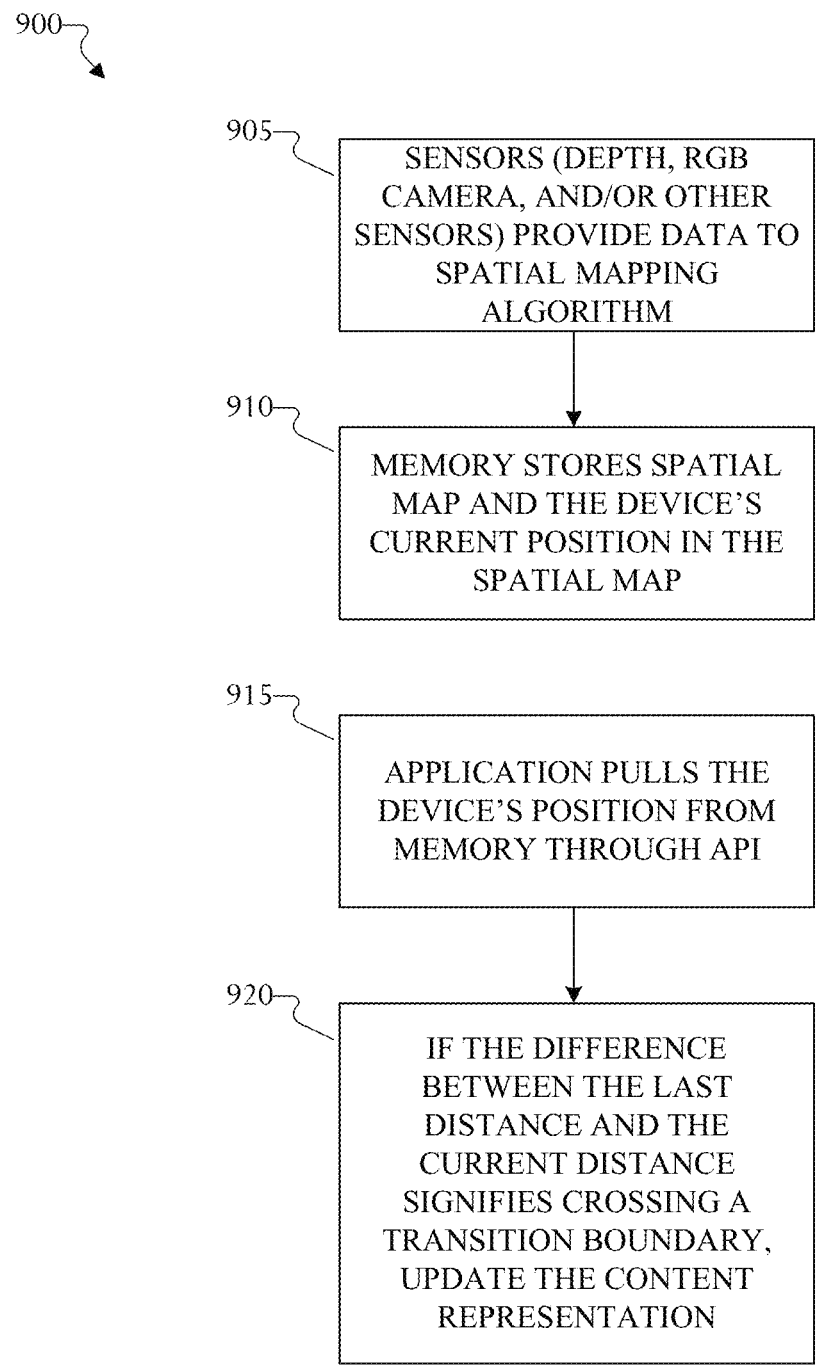
FIG. 9 is a flow chart of a method of transitioning virtual content of a virtual object when crossing a transition boundary based on spatial mapping according to this disclosure.

FIG. 9 is a flowchart of a method 900 of transitioning virtual content of the virtual object across in a transition boundary and when using a spatial map. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example illustrated is implemented by a processor, or processing circuitry in, for example, an electronic device or wearable device such as an augmented reality headset. The method 900. The method 900 will be discussed while making reference to the devices of FIGS. 1 and 2 and FIGS. 6A, B, C and FIG. 7.

As shown in FIG. 9, the method 900 begins in operation 905 wherein one or more sensors associated with an AR HMD device provides data to a spatial mapping algorithm application. Data can be stored in the memory 130. The sensors can be one or more of a variety of sensors including depth/distance sensors, an RGB camera, GPS, or other sensors that can be used to spatially map a geographical area. In operation 910, the mapping data can define a variety of real objects, walls, floors, routes, passageways, trails, windows, boundaries, appliances, IoT devices, doors, furniture, transportation vehicles, parking places, architectural layouts of indoor or outdoor structures, just to name a few. The mapping data can also define geographical locations of the real objects in the spatial map. The spatial map information or data is stored in the HMD device's memory. Additionally, the current HMD device location in the spatial map is also stored and updated periodically or continuously as the user wearing the HMD moves around.

Current and updated distances between the HMD device and nearby real objects in the spatial map may be calculated or determined periodically and on an ongoing basis.

In operation 915, an AR application, for example an application that pins virtual content to real world objects, can pull location information of an object of interest on the spatial map as well as the HMD device's position information on the spatial map. The object and HMD location information can be pulled from memory 130 through an API 145. In various embodiments, distance measurements between the HMD device and one or more of the spatially mapped objects can be measured and tracked by the HMD device. Virtual content can be pinned to or associated with an object of focus and displayed on the HUD in the environment with the object of focus.

In operation 920, a present or most recently measured distance between the HMD device and the object of focus is compared with a last or a past measured distance between the HMD and the object of focus in order to determine whether the distance between is increasing or decreasing. Also, when the difference between the last distance and the current/present distance signifies a crossing of a transition boundary, the pinned or associated virtual content is updated to provide more or less content for the user to view via the HUD of the HMD device.

In various embodiments, the difference between the last object distance and the current object distance is determined. An object distance is the distance between the HMD and the object of focus. An object of focus may be a real object or a virtual object in a virtual or real environment. A comparison is made between the last object distance in the current/present object distance to determine whether the object distance is increasing or decreasing. Additionally, a comparison is made between the last object distance and both of a CTBD and a FTBD associated with a TB there between. When the last object distance is greater than the CTBD and the current object distance is less than the CTBD, the virtual content associated with the object of focus is transitioned to virtual content associated with the object of focus being in a zone that is between the HMD and a TB. Additionally, when the last object distance is less than the FTBD and the current object distance is greater than the FTBD, the virtual content associated with the object of focus is transitioned to virtual content associated with the object of focus being in a zone further from the HMD than the TB.

Figure 10A:
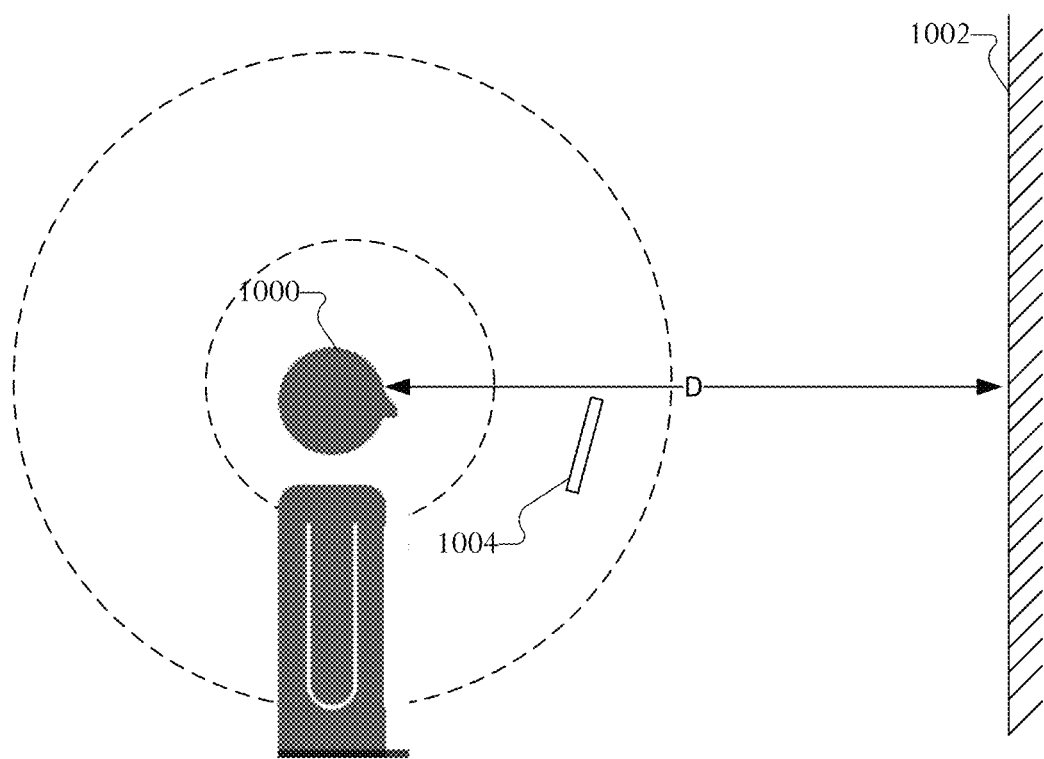
FIGS. 10A, 10B, 10C, and 10D illustrates a HUD's display as a user moves very close to a wall according to this disclosure.
Figure 10B:
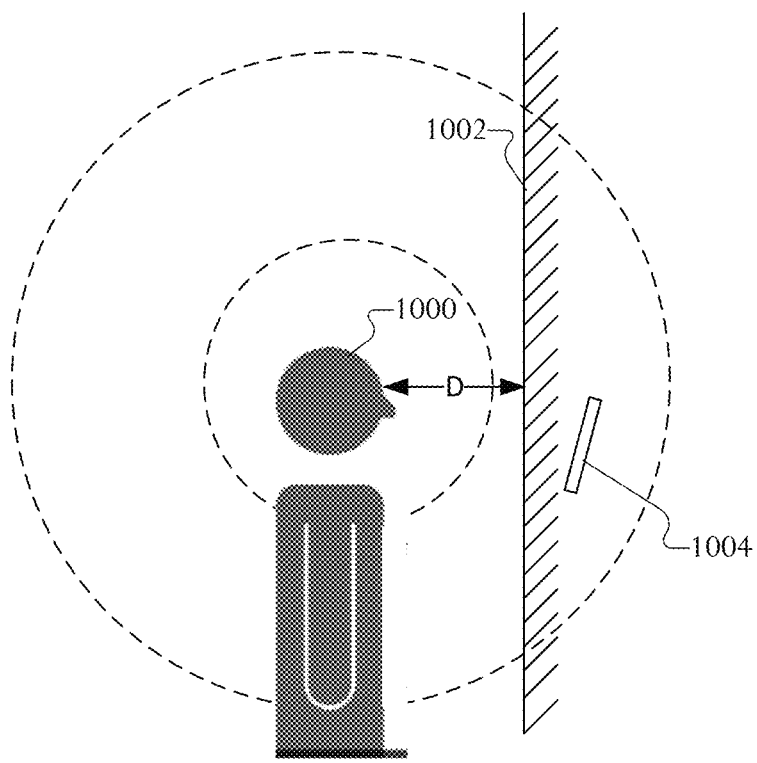
Figure 10C:
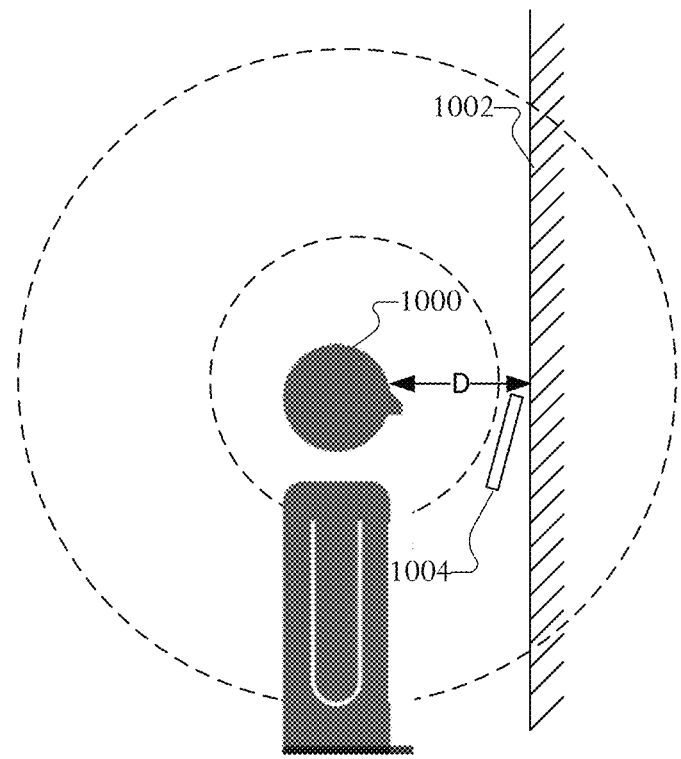
Figure 10D:
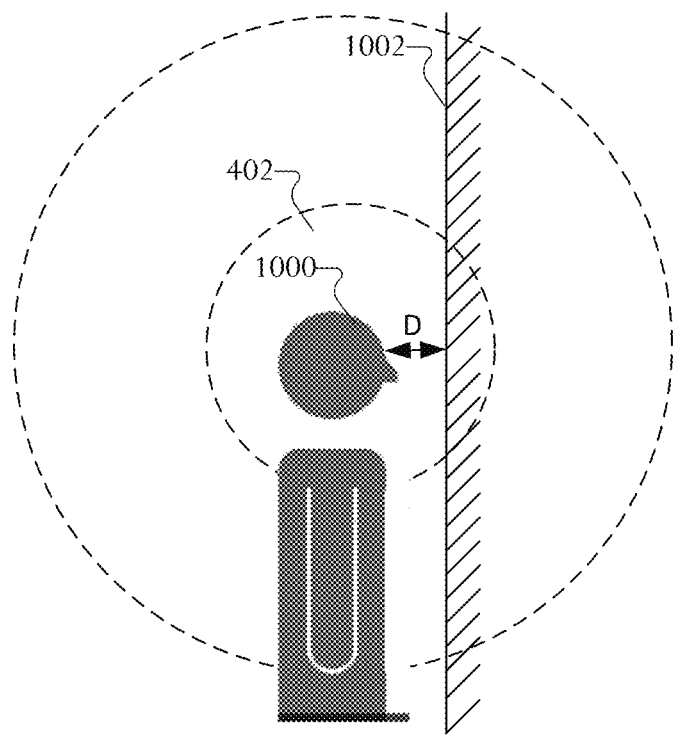

FIGS. 10A, 10B and 10C depict aspects of a distance-responsive heads up display (HUD) of an embodiment as a user moves very close to a real object such as a wall. Here a user wearing an AR HMD 700 approaches a real surface, in this case being a wall 2802 surface. In FIG. 10A, the user 1000 is viewing virtual content on a HUD 1004 as the user moves toward a wall 1002. The wall may be at a distance D from the user, which places the wall in, for example, the far zone 408 or medium zone 406. In FIG. 10B, the distance D may place virtual content displayed on the HUD 2804 in the near zone 404. In certain situations, the distance D to the wall 1002 will be closer than the rendering from the HUD 1004 and the virtual content will appear to "punch through" the wall 1002. In FIG. 10C, while in the near zone, the HUD 1004 can adjust the perceived distance between the user and the virtual content displayed on the HUD so that the content does not appear to be further away than the wall 1002, such that the virtual content does not appear "punched through" the wall 1002. In FIG. 10D, the user 1000 is so close to the wall 1002 that the wall 1002 is within the safe zone 402. When the object distance places virtual content in the safe zone 402, content transitions from being visible to no longer being visible or being clipped from view on the HUD 1004.

Figure 11:
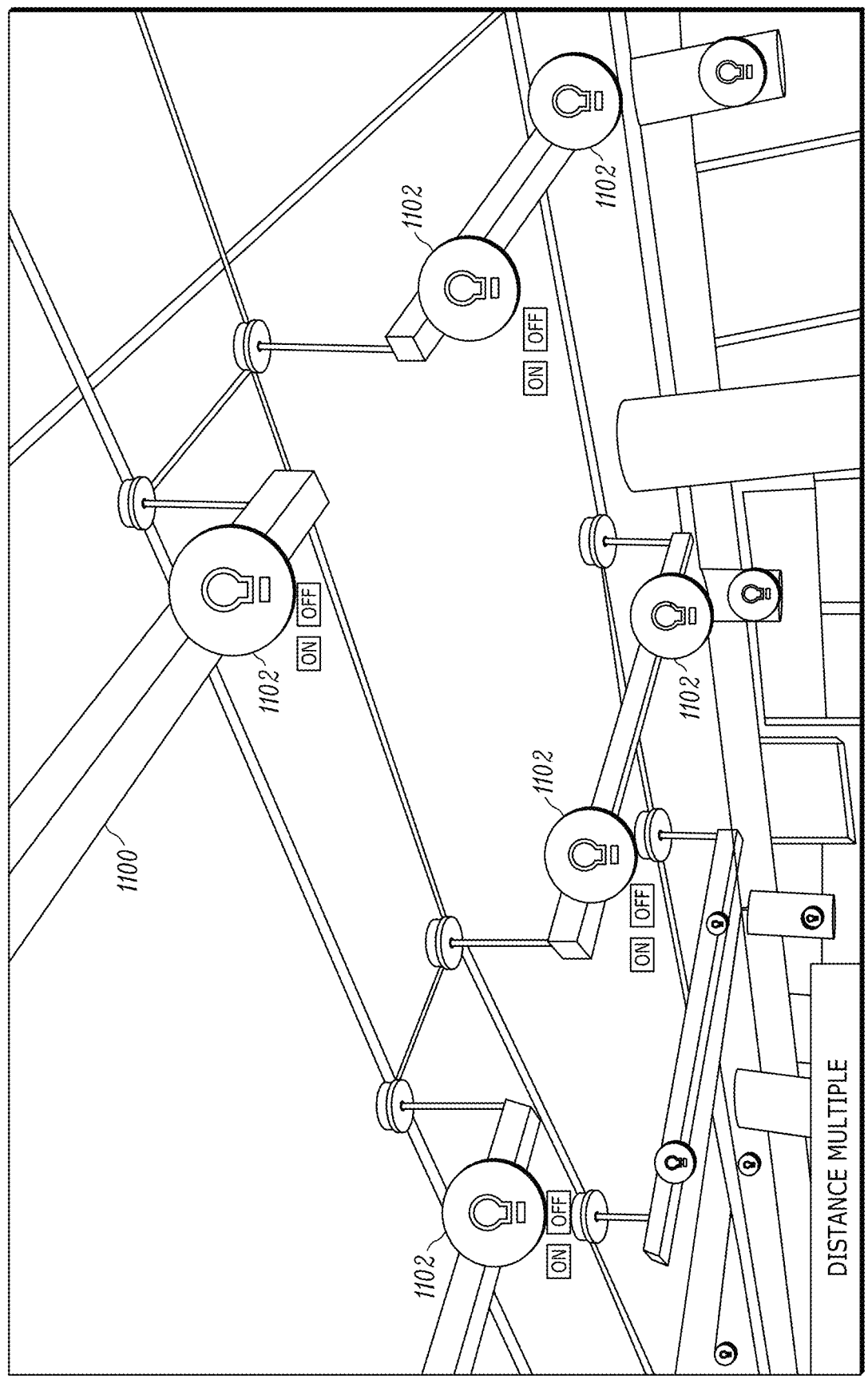
FIG. 11 illustrates an example view through an AR HMD device of near and distance augmentation according to this disclosure.

FIG. 11 depicts near and distance augmentation in accordance with an embodiment of the invention. As in-world objects are a greater distance from the user and are in the far zone, they become less visible in AR. When the distance between the user and a real object in the environment, for example an IoT controllable light fixture 1100, places the real object in the far zone 408 or beyond zone 410, the virtual content 1102 associated with the real object 1100 may not be displayed as augmented virtual content on the HUD. Yet, in the medium zone 406 and near zone 404, the virtual content 1102 can be displayed on the HUD of the AR HMD for use by the user. As content updates with distance between the AR HMD and real objects in the environment, virtual elements or virtual content my shrink or disappear the greater the determined distance between the virtual element (and its associated real object) and the AR HMD.

Figure 12A:
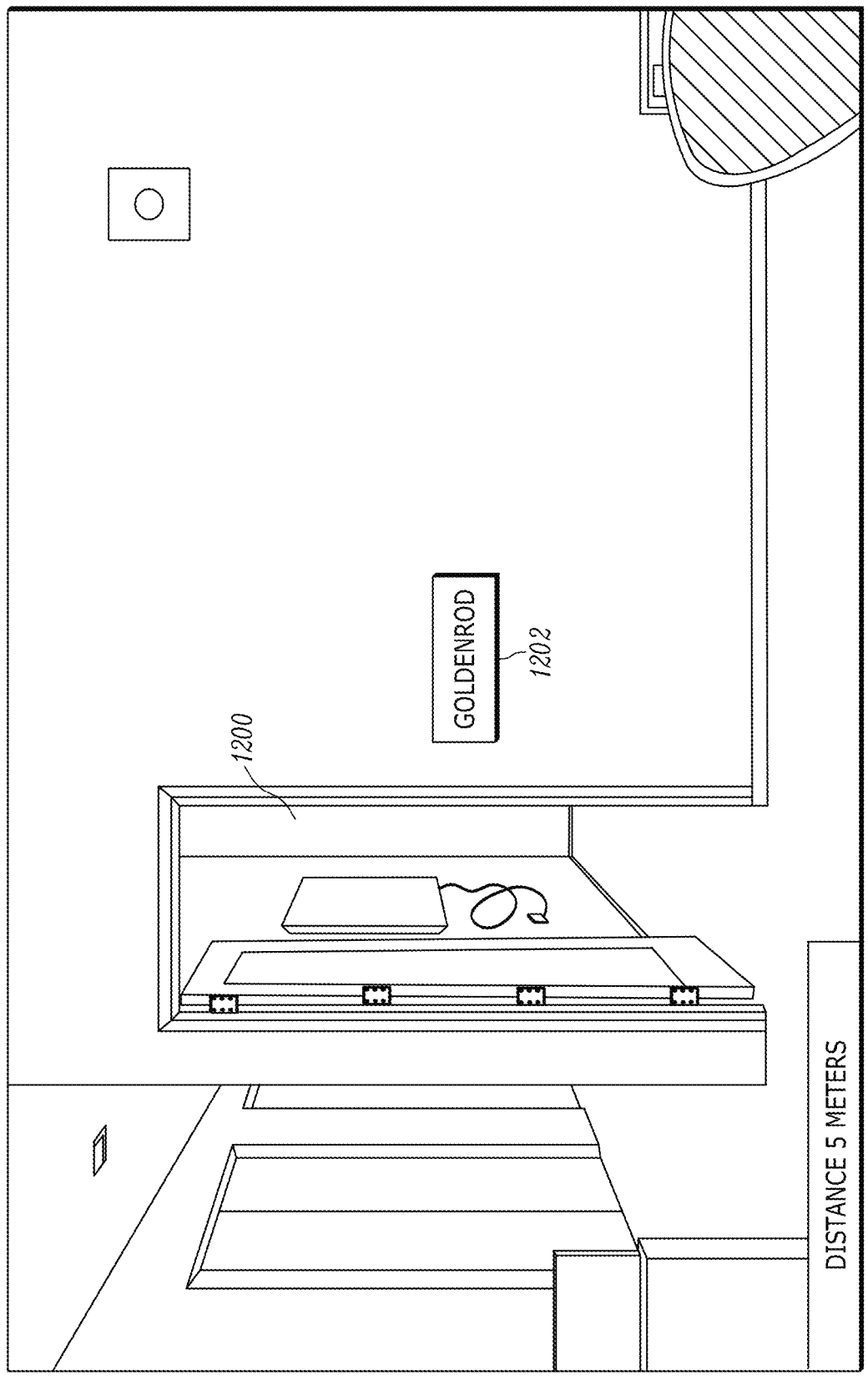
FIGS. 12A, 12B, and 12C illustrate example views through an AR HMD device of near and distance augmentation according to this disclosure.
Figure 12B:
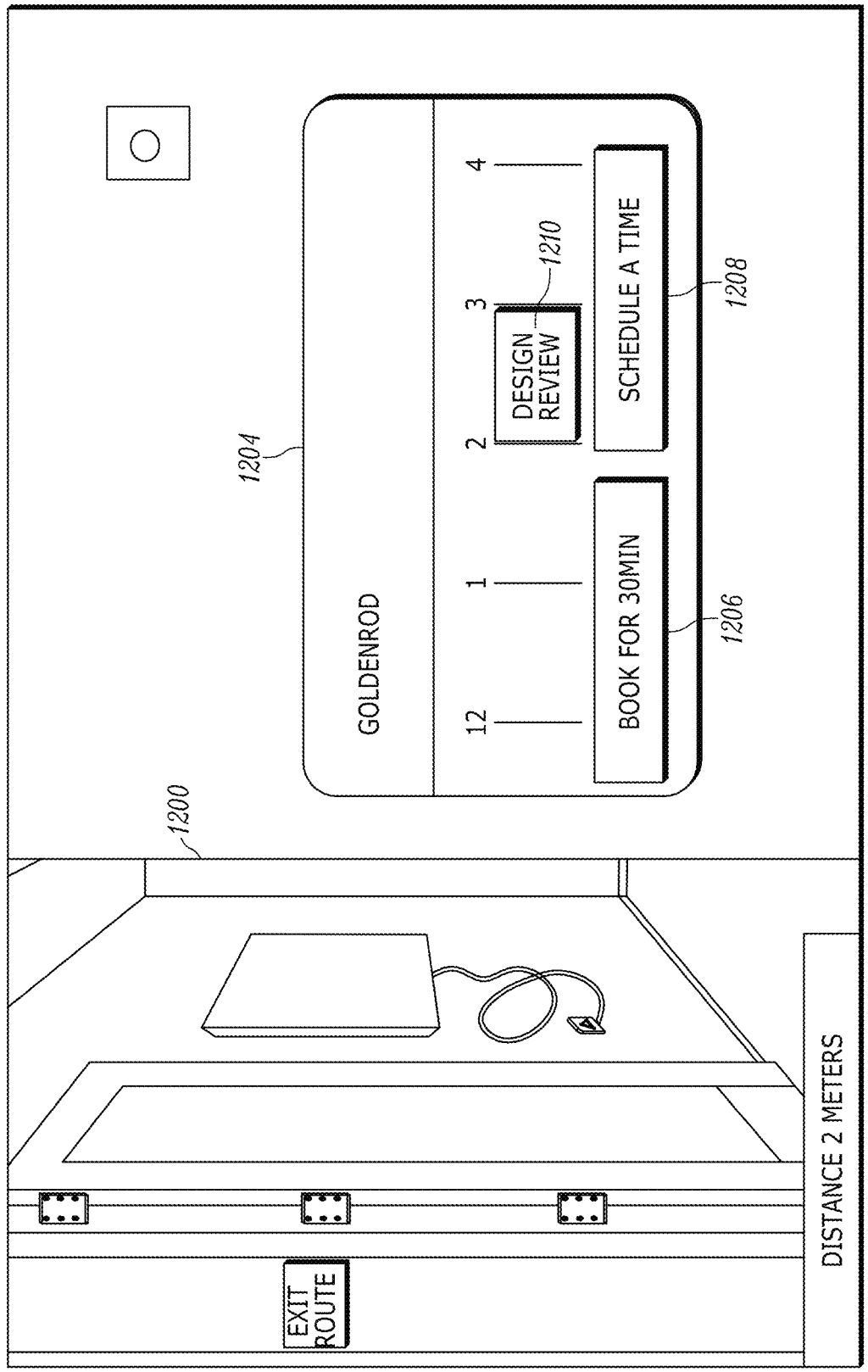
Figure 12C:
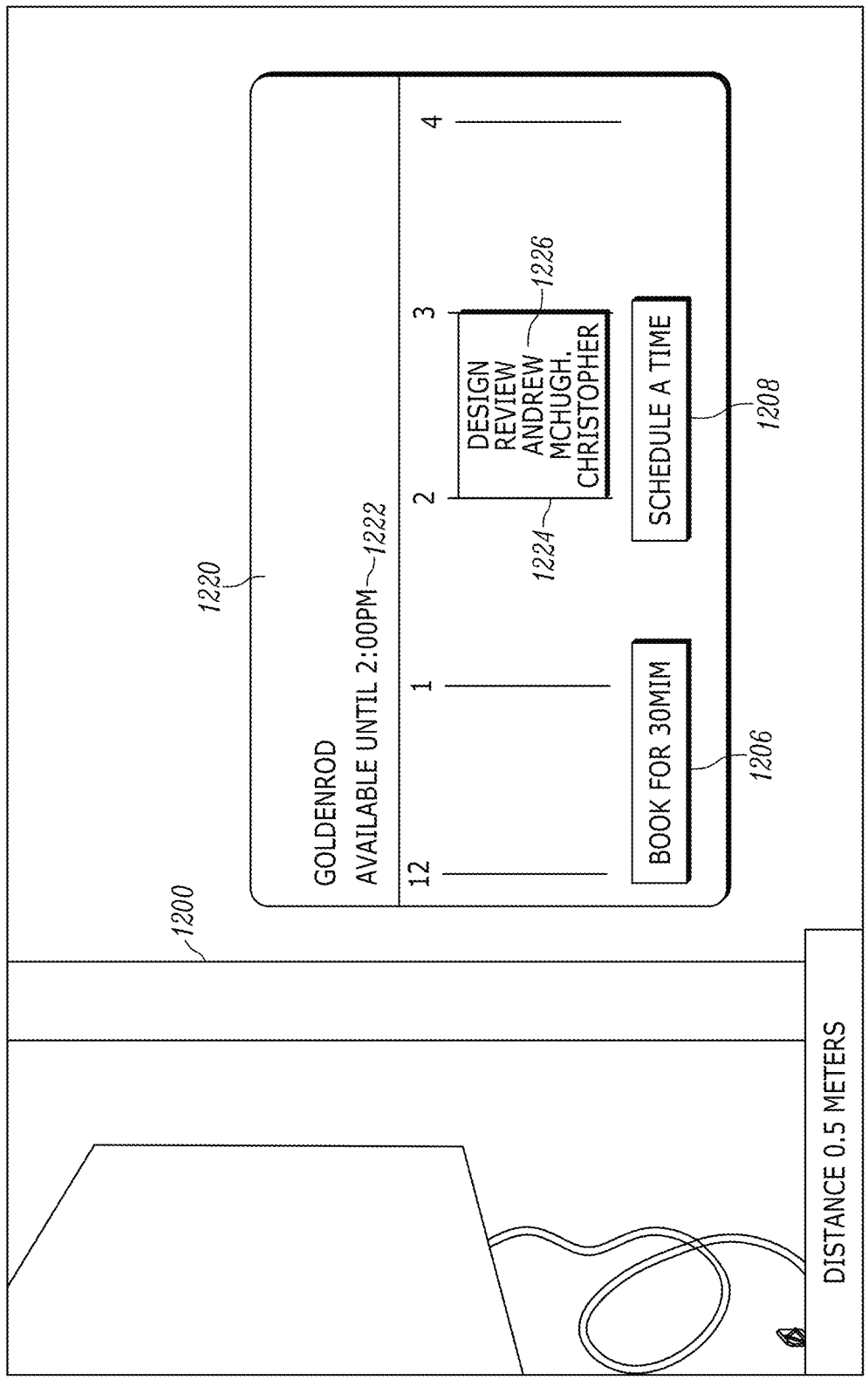

In FIGS. 12A, 12B and 12C, another near and distance augmentation in accordance with embodiments of the invention is shown. In FIG. 12A, a user wearing an AR HMD device is walking toward a meeting room doorway 1200. On a real surface, such as on a wall next to a conference room doorway 1200, virtual content 1202 is displayed. When the wall or doorway 1200 is a distance within the far zone from the user, the app may display pinned virtual content 1202 with only the meeting room's name and a color indicating the present availability of the meeting room. In FIG. 12B, the user continues to move toward the meeting room doorway 1200 and enters an object distance within the medium zone 406. Once the user enters the medium zone 406 the virtual content transitions to include more detailed virtual content 1204. For example, here the application transitions to show more detailed virtual content 1204 comprising a meeting room UI that provides a button to book the room for an amount of time since the room is available 1206, a button to schedule a meeting time in the future 1208, and an indication of the meeting room's schedule for the present day 1210. This additional detailed content would have been too small for the user to read or see when the user was farther away and in the far zone. In FIG. 12C, when the user gets even closer and the distance between the user and conference room doorway 1200 is within the near zone 404, the virtual content can transition to provide the most detailed content 1220 available about the meeting room. In this example, additional information that appears on the virtual meeting room UI can be a statement of availability 1222 and the name of the person 1224 responsible for the "Design Review" meeting scheduled 1226. Again, these additional detailed content elements would not be visible to the user of the AR HMD when further away from the doorway 1200.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those in the relevant art and is not intended to invoke 35 U.S.C. § 112(f).

Although the present disclosure has been described with example embodiments, various changes and modifications may be suggested to one skilled in the art. It is intended that the present disclosure encompass such changes and modifications as fall within the scope the appended claims.

What is claimed is:

1. A head mountable device (HMD) comprising:
    a display panel;
    a depth sensor;
    at least one processor coupled to the display panel and the depth sensor; and
    a memory coupled to the at least one processor, the memory including instructions executable by the at least one processor and configured to cause the at least one processor to:
        set a boundary at a boundary distance from the HMD;
        set a first transition distance (TD) at a first distance from the boundary;
        set a second TD at a second distance from the boundary, the first TD being closer to the HMD than the boundary and the boundary being closer to the HMD than the second TD;
        determine, based on data from the depth sensor, object distances between the HMD and a real object, the real object being associated with virtual object content;
        compare a previous object distance and a present object distance of the object distances with the first TD and with the second TD; and
        vary display information detail based on a change in a distance of the real object, wherein:
            when the previous object distance is greater than the boundary distance and the present object distance is less than the boundary distance but greater than the first TD, the processor is configured to maintain a display of the virtual object content on the display panel to display an information detail of the virtual object content in association with the real object,
            when the previous object distance is greater than the boundary distance and the present object distance is less than the first TD, the processor is configured to change display of the virtual object content on the display panel to display first information detail of the virtual object content in association with the real object,
            when the previous object distance is less than the boundary distance and the present object distance is greater than the boundary distance but less than the second TD, the processor is configured to maintain a display of the virtual object content on the display panel to display the information detail of the virtual object content in association with the real object, and
            when the previous object distance is less than the boundary distance and the present object distance is greater than the second TD, the processor is configured to change display of the virtual object content on the display panel to display second information detail of the virtual object content in association with the real object.

2. The HMD of claim 1, wherein the first information detail of the virtual object content comprises more information detail than the second information detail of the virtual object content.

3. The HMD of claim 1, wherein the virtual object content comprises a virtual user interface configured to control a function of the real object.

4. The HMD of claim 1, wherein the virtual object content is pinned to a location on the real object.

5. The HMD of claim 1, wherein the at least one processor is further configured to:
    set a third TD at a third distance from the HMD;
    set a fourth TD at a fourth distance from the HMD, wherein the second TD is less than the third TD, and wherein the third TD is less than the fourth TD; and
    compare the previous object distance and the present object distance of the object distances with the third TD and with the fourth TD,
        when the previous object distance is greater than the third TD and the present object distance is less than the third TD, the processor is configured to change display of the virtual object content on the display panel to display the second information detail of the virtual object content in association with the real object, and
        when the previous object distance is less than the fourth TD and the present object distance is greater than the fourth TD, the processor is configured to change display of the virtual object content on the display panel to display third information detail of the virtual object content in association with the real object.

6. The HMD of claim 5, wherein the second information detail of the virtual object content comprises more information detail than the third information detail of the virtual object content.

7. The HMD of claim 1, wherein the at least one processor is further configured to display the virtual object content as augmented reality (AR) graphics on the display panel.

8. The HMD of claim 1, wherein at least one of the first distance and the second distance is set based on a transition zone (tzone) distance, the tzone distance is set by at least one of an augmented reality application, the HMD, and a user input.

9. A method for transitioning virtual content in augmented reality, the method comprising:
    setting a boundary at a boundary distance from a head mountable device (HMD);
    setting a first transition distance (TD) at a first distance from the boundary;
    setting a second TD a second distance from the boundary, the first TD being closer to the HMD than the boundary and the boundary being closer to the HMD than the second TD;
    determining, based on data from a depth sensor, object distances between the HMD and a real object, the real object being associated with virtual object content;

comparing a previous object distance and a present object distance of the object distances with the first TD and with the second TD; and varying display information detail based on a change in a distance of the real object, wherein:

when the previous object distance is greater than the boundary distance and the present object distance is less than the boundary distance but greater than the first TD, maintaining a display of an information detail of the virtual object content in association with the real object, when the previous object distance is greater than the boundary distance and the present object distance is less than the first TD, then changing display of the virtual object content on a display panel of the HMD to displaying first information detail of the virtual object content in association with the real object, when the previous object distance is less than the boundary distance and the present object distance is greater than the boundary distance but less than the second TD, maintaining a display of the information detail of the virtual object content in association with the real object, and when the previous object distance is less than the boundary distance and the present object distance is greater than the second TD, then changing display of the virtual object content on the display panel of the HMD to displaying second information detail of the virtual object content in association with the real object.

10. The method of claim 9, wherein the first information detail of the virtual object content comprises more information detail than the second information detail of the virtual object content.

11. The method of claim 9, wherein the virtual object content comprises a virtual user interface configured to control a function of the real object.

12. The method of claim 9, wherein the virtual object content is pinned to a location on the real object.

13. The method of claim 9, further comprising:
setting a third TD at a third distance from the HMD;
setting a fourth TD at a fourth distance from the HMD, wherein the second TD is less than the third TD, and wherein the third TD is less than the fourth TD; and
comparing the previous object distance and the present object distance of the object distances with the third TD and the fourth TD, when the previous object distance is greater than the third TD and the present object distance is less than the third TD, then changing display of the virtual object content on the display panel of the HMD to displaying second information detail of the virtual object content in association with the real object, and when the previous object distance is less than the fourth TD and the present object distance is greater than the fourth TD, then changing display of the virtual object content on the display panel of the HMD to displaying third information detail of the virtual object content in association with the real object.

14. The method of claim 13, wherein the second information detail of the virtual object content comprises more information detail than the third information detail of the virtual object content.

15. The method of claim 13, further comprising displaying the virtual object content as augmented reality (AR) graphics on the display panel.

16. The method of claim 13, further comprising setting at least one of the first distance and the second distance based on a transition zone (tzone) distance, the tzone distance being set by at least one of an augmented reality application, the HMD and a user input.

17. A non-transitory computer-readable medium comprising program code for augmented reality, that when executed by at least one processor, causes an electronic device to:
set a boundary at a boundary distance from a head mountable device (HMD);
set a first transition distance (TD) at a first distance from the boundary;
set a second TD at a second distance from the boundary, the first TD being closer to the HMD than the boundary and the boundary being closer to the HMD than the second TD;
determine, based on data from a depth sensor, object distances between the HMD and a real object, the real object being associated with virtual object content;
compare a previous object distance and a present object distance of the object distances with the first TD and with the second TD; and
vary display information detail based on a change in a distance of the real object, wherein:

when the previous object distance is greater than the boundary distance and the present object distance is less than the boundary distance but greater than the first TD, the processor is configured to maintain a display of the virtual object content on a display panel to display an information detail of the virtual object content in association with the real object, when the previous object distance is greater than boundary distance and the present object distance is less than the first TD, change display of the virtual object content on a display panel of the HMD to display first information detail of the virtual object content in association with the real object, when the previous object distance is less than the boundary distance and the present object distance is greater than the boundary distance but less than the second TD, the processor is configured to maintain a display of the virtual object content on the display panel to display the information detail of the virtual object content in association with the real object, and when the previous object distance is less than the boundary distance and the present object distance is greater than the second TD, change display of the virtual object content on the display panel of the HMD to display second information detail of the virtual object content in association with the real object.

18. The non-transitory computer-readable medium of claim 17, wherein the first information detail of the virtual object content comprises more information detail than the second information detail of the virtual object content.

19. The non-transitory computer-readable medium of claim 17, wherein the virtual object content comprises a virtual user interface configured to control a function of the real object.

20. The non-transitory computer-readable medium of claim 17, wherein the virtual object content is pinned to a location on the real object.

* * * * *